US011523077B2

(12) United States Patent
Furui et al.

(10) Patent No.: US 11,523,077 B2
(45) Date of Patent: Dec. 6, 2022

(54) ELECTRONIC DEVICE AND CONTROL METHOD THEREOF

(71) Applicant: Innolux Corporation, Miao-Li County (TW)

(72) Inventors: Yuko Furui, Miao-Li County (TW); Akihiro Iwatsu, Miao-Li County (TW); Shuji Hagino, Miao-Li County (TW)

(73) Assignee: Innolux Corporation, Miaoli County (TW)

( * ) Notice: Subject to any disclaimer, the term of this patent is extended or adjusted under 35 U.S.C. 154(b) by 0 days.

(21) Appl. No.: 17/129,738

(22) Filed: Dec. 21, 2020

(65) Prior Publication Data
US 2022/0201228 A1    Jun. 23, 2022

(51) Int. Cl.
*H04N 5/363* (2011.01)
*H04N 5/378* (2011.01)
*H04N 5/374* (2011.01)

(52) U.S. Cl.
CPC ............ *H04N 5/363* (2013.01); *H04N 5/374* (2013.01); *H04N 5/378* (2013.01)

(58) Field of Classification Search
CPC ......... H04N 5/363; H04N 5/374; H04N 5/378
See application file for complete search history.

(56) References Cited

U.S. PATENT DOCUMENTS

| | | | | |
|---|---|---|---|---|
| 6,856,351 | B1* | 2/2005 | Weisfield | H04N 5/3597 257/E27.111 |
| 2005/0092895 | A1* | 5/2005 | Fossum | H04N 5/3559 250/208.1 |
| 2006/0108507 | A1 | 5/2006 | Huang | |
| 2011/0007197 | A1* | 1/2011 | Masuyama | H04N 5/3658 348/296 |
| 2012/0200753 | A1* | 8/2012 | Endoh | H04N 5/3658 348/301 |
| 2013/0112753 | A1* | 5/2013 | Wang | H04N 5/347 235/472.01 |
| 2021/0183926 | A1* | 6/2021 | Choi | H04N 5/3591 |

FOREIGN PATENT DOCUMENTS

TW     201015993     4/2010

* cited by examiner

*Primary Examiner* — Sinh Tran
*Assistant Examiner* — Zhenzhen Wu
(74) *Attorney, Agent, or Firm* — JCIPRNET

(57) ABSTRACT

An electronic device and a control method are provided. The electronic device includes a sensing pixel. The sensing pixel includes a photosensitive element, a first transistor, a second transistor and a third transistor. The first transistor is coupled to the photosensitive element and for receiving a reset signal. The second transistor is coupled to the photosensitive element. The third transistor is coupled to the second transistor and for receiving a scan signal. During a reset period, a reset signal waveform of the reset signal and a first scan signal waveform of the scan signal are at least partially overlapped.

15 Claims, 9 Drawing Sheets

ELECTRONIC DEVICE AND CONTROL METHOD THEREOF

BACKGROUND

Technical Field

The disclosure relates to a device, and particularly relates to an electronic device and a control method thereof.

Description of Related Art

For a general image sensor, since when the multiple transistors of the sensing pixels of image sensor (for example, a 3T structure) switching between different operation modes, some circuit nodes in the circuit of the sensing pixel may be floating, so that the voltages of the some circuit nodes become unstable, and easily affected by the leakage current or the capacitive coupling effect of the transistor. Thus, the general image sensor usually has the problem of output loss. In view of this, several embodiments are proposed in the following.

SUMMARY

The electronic device of the disclosure includes a sensing pixel. The sensing pixel includes a photosensitive element, a first transistor, a second transistor and a third transistor. The first transistor is coupled to the photosensitive element and for receiving a reset signal. The second transistor is coupled to the photosensitive element. The third transistor is coupled to the second transistor and for receiving a scan signal. During a reset period, a reset signal waveform of the reset signal and a first scan signal waveform of the scan signal are at least partially overlapped.

The control method of the disclosure for an electronic device including a sensing pixel. The control method includes following steps: during a reset period, providing a reset signal to the sensing pixel; and during the reset period, providing a scan signal to the sensing pixel. A reset signal waveform of the reset signal and a first scan signal waveform of the scan signal are at least partially overlapped.

The electronic device of the disclosure includes a sensing pixel. The sensing pixel includes a photosensitive element, a first transistor, a second transistor, a third transistor, and a clamp circuit. The first transistor is coupled to the photosensitive element and for receiving a reset signal. The second transistor is coupled to the photosensitive element. The third transistor is coupled to the second transistor. The clamp circuit is coupled to the second transistor.

Based on the above, according to the electronic device and the control method for the electronic device of the disclosure, the electronic device and the control method are capable of improving an output loss of a sensing pixel of the electronic device.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1A:
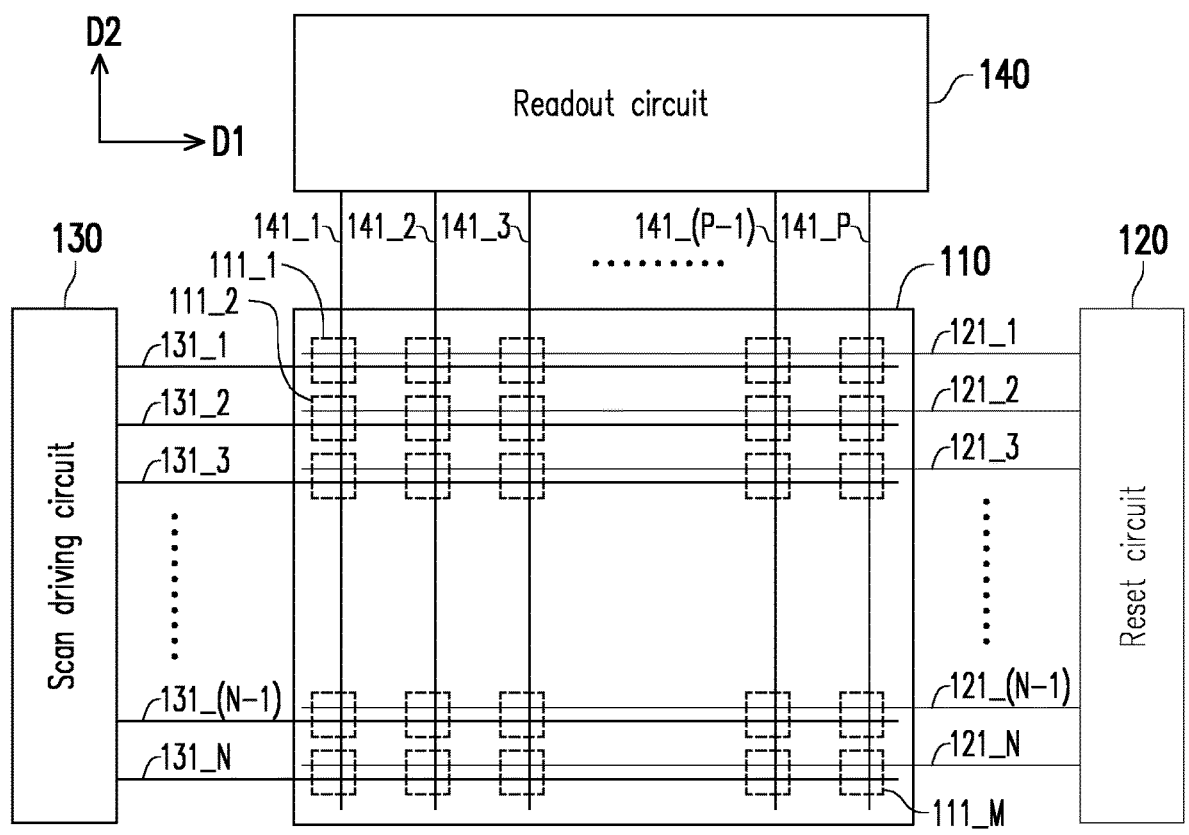
FIG. 1A illustrates a schematic diagram of an electronic device according to an embodiment of the disclosure.

Throughout the specification and appended claims of the disclosure, certain terms are used to refer to specific components. A person of ordinary skill in the art should understand that display apparatus manufacturers may refer to the same components by different names. In the specification, it is not intended to distinguish between components that have the same function but different names. In the following specification and claims, the words "containing" and "including" are open-ended words and therefore should be interpreted as "containing but not limited to . . . ".

In some embodiments of the disclosure, regarding the words such as "coupled", "interconnected", etc. Referring to bonding and connection, unless specifically defined, these words mean that two structures are in direct contact or two structures are not in direct contact, and other structures are provided to be disposed between the two structures. The word for joining and connecting may also include the case where both structures are movable or both structures are fixed. In addition, the word "coupled" may include to any direct or indirect electrical connection means.

The ordinal numbers used in the specification and claims, such as "first", "second", etc., are used to modify the components, and they do not imply or represent the, or these, components have any previous ordinal numbers, do not represent the order of a component and another component, or the order of a manufacturing method. The use of these ordinal numbers is only used to clearly distinguish a component with a certain name from another component with the same name. The terms used in the claims and the specification may not have to be the same, and accordingly, the first component provided in the specification may be the second component in the claims. It should be understood that in the following embodiments, the technical features of several different embodiments may be replaced, recombined, and mixed to complete other embodiments without departing from the spirit of the disclosure.

The transistors of the disclosure (such as the transistors M1 to M3 of FIG. 1B, etc.) may include semiconductor materials, such as amorphous silicon, low temperature poly-Silicon (LTPS) or metal oxide. The transistor may be a thin film transistor including a top gate, a bottom gate, or a dual gate or double gate, or a combination of the above materials, and the disclosure is not limited thereto. In some embodiments, the thin film transistor may have the different semiconductor materials described above. In addition, the first terminal, the second terminal, and the control terminal of the transistor (such as the transistors M1 to M3 of FIG. 1B, etc.) of the disclosure may be a drain, a source, and a gate, respectively, but the disclosure is not limited thereto. The first terminal, the second terminal of the diode (such as the photosensitive element PD and clamp diode CD, etc.) of the disclosure may be a cathode, and an anode, respectively, but the disclosure is not limited thereto.

FIG. 1A illustrates a schematic diagram of an electronic device according to an embodiment of the disclosure. Referring to FIG. 1A, an electronic device 100 includes a panel 110, a reset circuit 120, a scan driving circuit 130, and a readout circuit 140. The panel 110 includes a plurality of sensing pixels 111_1 to 111_M, and the sensing pixels 111_1 to 111_M are arranged to form a sensing array, where M is a positive integer. The plurality of sensing pixels 111_1 to 111_M can be disposed in an array form, including a plurality of rows extending along a row direction D1 and a plurality of columns extending along a column direction D2. In the embodiment of the disclosure, the reset circuit 120 is coupled to the sensing pixels 111_1 to 111_M through a plurality of reset signal lines 121_1 to 121_N, where N is a positive integer. Each of the reset signal lines 121_1 to 121_N is coupled to corresponding row of the sensing pixels 111_1 to 111_M. The scan driving circuit 130 is coupled to the sensing pixels 111_1 to 111_M through a plurality of scan signal lines 131_1 to 131_N. Each of the scan signal lines 131_1 to 131_N is coupled to corresponding row of the sensing pixels 111_1 to 111_M. The readout circuit 140 is coupled to the sensing pixels 111_1 to 111_M through a plurality of output signal lines 141_1 to 141_P, where P is a positive integer. Each of the output signal lines 141_1 to 141_P is coupled to corresponding column of the sensing pixels 111_1 to 111_M. In the embodiment of the disclosure, the each row of the sensing pixels 111_1 to 111_M may respectively receive the reset signals RS_1 to RS_N having different waveforms in a time period, but the disclosure is not limited thereto. In one embodiment of the disclosure, the reset signals RS_1 to RS_N may be the same common reset signal provided by the reset circuit 120, and the each row of the sensing pixels 111_1 to 111_M may simultaneously receive the reset signals RS_1 to RS_N having a same signal waveform in the time period.

In the embodiment of the disclosure, the electronic device 100 may be an image sensing device, and the image sensing device may be, for example, a X-ray image sensor, a fingerprint sensor, or a photo sensor. In other words, the sensing pixels 111_1 to 111_M may be configured to sense visible light or visible light converted x-ray or other invisible light. In some embodiments, as shown in FIG. 1A, the reset circuit 120, the scan driving circuit 130, and the readout circuit 140 may be arranged outside the panel 110. Alternatively, in the embodiment of the disclosure, although not shown in figures, the reset circuit 120, the scan driving circuit 130, and the readout circuit 140 may be disposed in the peripheral area of the panel 110. The disclosure does not limit the arrangement locations of the reset circuit 120, the scan driving circuit 130, and the readout circuit 140 in the peripheral area of the panel 110. In addition, in one embodiment of the disclosure, the reset circuit 120, the scan driving circuit 130, and the readout circuit 140 may be integrated into one integrated circuit or "on-glass" circuit.

Figure 1B:
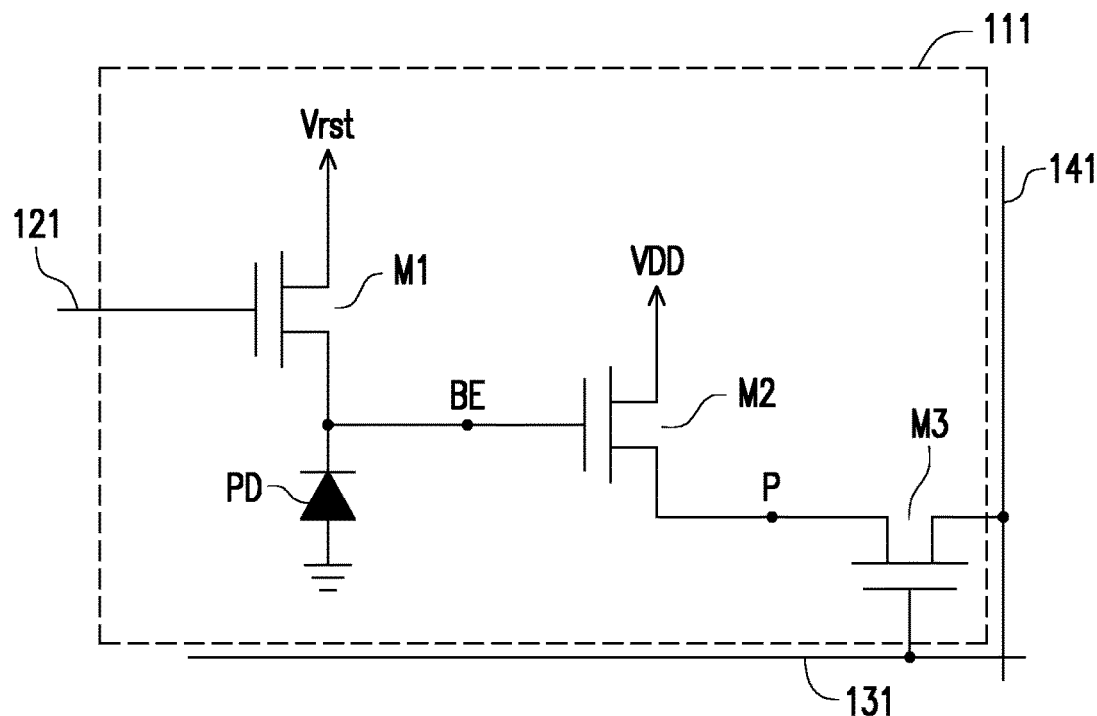
FIG. 1B illustrates a schematic diagram of a sensing pixel according to a first embodiment of the disclosure.

FIG. 1B illustrates a schematic diagram of a sensing pixel according to a first embodiment of the disclosure. Referring to FIG. 1B, the circuit architecture of each of the sensing pixels 111_1 to 111_M of FIG. 1A may be the same as the circuit architecture of the sensing pixel 111 of FIG. 1B. The sensing pixel 111 includes at least three transistors, that is, a first transistor M1, a second transistor M2, and a third transistor M3, and a photosensitive element PD. For example, the photosensitive element PD can be a photodiode. In the embodiment of the disclosure, the sensing pixel 111 may be a 3T architecture of an active pixel sensor (APS), but the disclosure is not limited thereto. In the embodiment of the disclosure, the first transistor M1 can be coupled to the photosensitive element PD and can receive a reset signal (RS). The second transistor M2 can be coupled to the photosensitive element PD. The third transistor M3 can be coupled to the second transistor M2 and can receive a scan signal (SS). Specifically, a first terminal of the transistor (reset transistor) M1 is coupled to a reset voltage Vrst, and a second terminal of the transistor M1 is coupled to a first terminal of the photosensitive element PD. A control terminal of the transistor M1 is coupled to a reset signal line 121, where the reset signal line 121 may be one of the reset signal lines 121_1 to 121_N of FIG. 1A. A second terminal of the photosensitive element PD is coupled to a ground voltage. A control terminal of the transistor M2 is coupled to the first terminal of the photosensitive element PD, and the first terminal of the transistor M2 is coupled to a power supply voltage (VDD), but the disclosure is not limited thereto. A first terminal of the transistor (select transistor) M3 is coupled to a second terminal of transistor M2, and a control terminal of the transistor M3 is coupled to a scan signal line 131, where the scan signal line 131 may be one of the scan signal lines 131_1 to 131_N of FIG. 1A. A second terminal of the transistor M3 is coupled to an output signal line 141, where the output signal line 141 may be one of the output signal lines 141_1 to 141_P of FIG. 1A.

Specifically, in the embodiment of the disclosure, the control terminal of the transistor M1 may be configured to receive a reset signal through the reset signal line 121, so as to reset the photosensitive element PD and a node voltage of a node BE, where the node BE is located between the first terminal of the photosensitive element PD and the control terminal of the transistor M2. The control terminal of the transistor M3 may be configured to receive a scan signal through the scan signal line 131. The scan signal line 131 can be coupled to the third transistor M3 for providing the scan signal to the third transistor M3. According to some embodiments, when the transistor M3 is turned on, the transistor M2 is operated as the source follower circuit, and a node voltage of the node P (output node) can be readout from the output signal line 141 through the transistor M3, where the node P is located between the second terminal of the transistor M2 and the first terminal of the transistor M3. The output signal line 141 can be coupled to the third transistor M3 for outputting a sensing signal. The node P can be referred to as a readout node. In the embodiment of the disclosure, the node voltage of the node P depends on the node voltage of a node BE. When the transistor M1 and transistor M3 are turned off, since the node P is in floating state and there may have the leakage current from the first terminal to the second terminal of the transistor M2, the node voltage of node P may be raised. (This is for NMOS case. If it's PMOS case, the node P can have opposite behavior.) Due to the capacitive coupling effect between the control terminal and the second terminal of the transistor M2, the node voltage of the node BE may also be raised from the coupling of the voltage of node P.

Figure 2A:
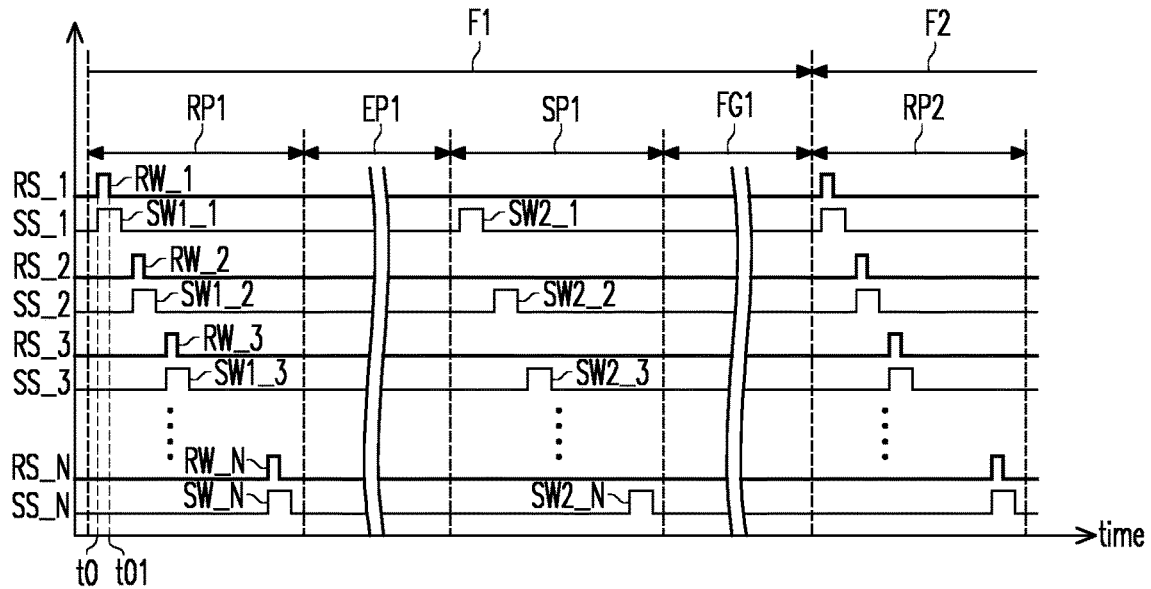
FIG. 2A illustrates a timing diagram of the operation of the electronic device according to an embodiment of the disclosure.

FIG. 2A illustrates a timing diagram of the operation of the electronic device according to an embodiment of the disclosure. Referring to FIG. 1A to FIG. 2A, each row of the sensing pixels 111_1 to 111_M may respectively receive a plurality of reset signals RS_1 to RS_N through the reset signal lines 121_1 to 121_N, and the each row of the sensing pixels 111_1 to 111_M may respectively receive a plurality of scan signals SS_1 to SS_N through the scan signal lines 131_1 to 131_N. Specifically, as shown in FIG. 2A, a sensing frame F1 (one frame) includes a reset period RP1, an exposure period EP1, a scan period SP1, and a frame gap period FG1. During the reset period RP1, the multiple rows of the sensing pixels 111_1 to 111_M may respectively receive a plurality of reset signal waveforms RW_1 to RW_N of the reset signals RS_1 to RS_N in a time-sharing and sequential manner, and the multiple rows of the sensing pixels 111_1 to 111_M may respectively receive a plurality of first scan signal waveforms SW1_1 to SW1_N of the scan signals SS_1 to SS_N in a time-sharing and sequential manner. Specifically, referring to FIG. 2A, during the reset period RP1, a reset signal waveform (for example, RW1) of the reset signal RS and a first scan signal waveform (for example, SW1) of the scan signal SS are at least partially overlapped, but the disclosure is not limited thereto. According to some embodiments, two waveforms are at least overlapped means that a waveform and another waveform occur simultaneously during at least a time period. Taking the two waveforms RW_1 and SW1_1 as an example, the reset signal waveforms RW_1 of the reset signal RS and the first scan signal waveform SW_1 of the scan signal SS_1 occur simultaneously during a time period from time t0 to time t01.

In some embodiments, during the reset period RP1, two or more of the reset signal waveforms of the reset signal RS and two or more of the first scan signal waveforms (for example, SW1) of the scan signal SS are at least partially overlapped respectively. For example, during the reset period RP1, the reset signal waveform RW_1 of the reset signal RS and the first scan signal waveform SW_1 are at least partially overlapped, and the reset signal waveform RW_2 of the reset signal RS and the first scan signal waveform SW_2 are at least partially overlapped.

In some embodiments, referring to FIG. 1A and FIG. 2A, during the reset period RP1, the reset circuit 120 provides the reset signal RS_1 through the reset signal line 121_1 to a first row of the sensing pixels (including the sensing pixels 111_1), and the reset circuit 120 provides the reset signal RS_2 through the reset signal line 121_2 to a second row of the sensing pixels (including the sensing pixels 111_2). Specifically, the reset circuit 120 is coupled to a sensing pixel 111_1 and another sensing pixel 111_2, and configured to provide a reset signal RS_1 and another reset signal RS_2 to the sensing pixel 111_1 and the another sensing pixel 111_2, respectively. The sensing pixel 111_1 and the another sensing pixel 111_2 can be disposed on adjacent rows, which means that there is no sensing pixel disposed between the sensing pixel 111_1 and the another sensing pixel 111_2 along the column direction D2. According to some embodiments, referring to FIG. 2A, during the reset period RP1, a reset signal waveform RW_1 of the reset signal RS_1 and another reset signal waveform RW_2 of the another reset signal RS_2 are not overlapped, but the disclosure is not limited thereto. According to some embodiments, two waveforms are not overlapped means that the two waveforms do not occur simultaneously. Specifically, any time point of a waveform and any time point of another waveform do not occur simultaneously. Taking the two waveforms RW_1 and RW_2 as an example, during the reset period RP1, the waveform RW_1 of the reset signal RS_1 and the another waveform RW_2 of the another reset signal RS_2 do not occur simultaneously. Specifically, in some embodiments, a rising edge of the another waveform RW_2 of the another reset signal RS_2 occurs later than a falling edge of the waveform RW_1 of the reset signal RS_1. In some embodiments, a rising edge of the another waveform RW_2 of the another reset signal RS_2 occurs at the same time as a falling edge of the waveform RW_1 of the reset signal RS_1.

In some embodiments, the each row of the sensing pixels 111_1 to 111_M may synchronously receive a corresponding reset signal waveform and a corresponding scan signal waveform. During the exposure period EP1, the sensing pixels 111_1 to 111_M may perform an exposure operation respectively at the same time or at different times. During the scan period SP1, the rows of the sensing pixels 111_1 to 111_M may respectively receive a plurality of second scan signal waveforms SW2_1 to SW2_N of the scan signals SS_1 to SS_N in a time-sharing and sequential manner, thus the readout circuit 140 may correspondingly read a plurality of sensing signals from the sensing pixels 111_1 to 111_M through the output signal lines 141_1 to 141_P in a time-sharing and sequential manner. According to some embodiments, referring to FIG. 2A, the scan signal SS_1 includes a second scan signal waveform SW2_1, and during the sensing frame F1, the first scan signal waveform SW1_1 and the second scan signal waveform SW2_1 are not overlapped.

Similarly, after the frame gap period FG1, the sensing pixels 111_1 to 111_M may receive another plurality of reset signal waveforms of the reset signals RS_1 to RS_N and another plurality of first scan signal waveforms SW1_1 to SW1_N in the same way during a reset period RP2 of a sensing frame F2 (next one frame).

Figure 2B:
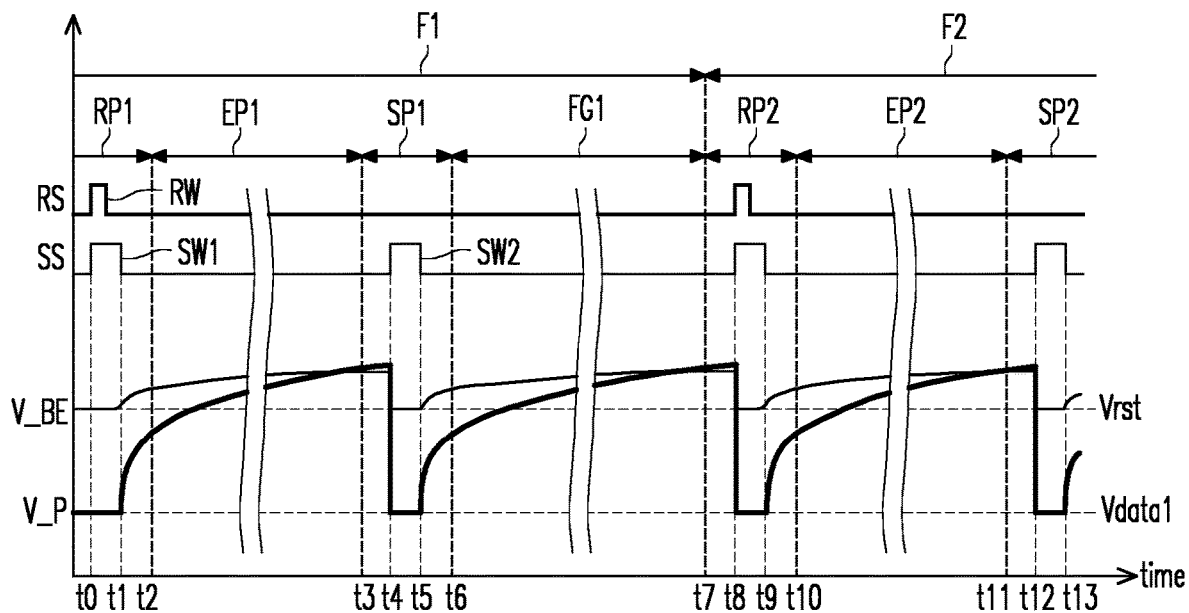
FIG. 2B illustrates a timing diagram of the operation of the sensing pixel of FIG. 1B in the dark state according to an embodiment of the disclosure.

FIG. 2B illustrates a timing diagram of the operation of the sensing pixel of FIG. 1B in the dark state according to an embodiment of the disclosure. Referring to FIG. 1A, FIG. 1B, and FIG. 2B, the following embodiment will take the one sensing pixel 111 of FIG. 1B in the dark state as an example. In the embodiment of the disclosure, the control terminal of the transistor M1 receives a reset signal RS and the control terminal of the transistor M3 receives a scan signal SS. During the sensing frame F1, the first scan signal waveform SW1 of the scan signal SS and the second scan signal waveform SW2 of the scan signal SS are not overlapped. In the embodiment of the disclosure, a time length between a rising edge and a falling edge of the reset signal waveform RW of the reset signal RS may less than a time length between a rising edge and a falling edge of the first scan signal waveform SW1 of the scan signal SS. In other words, as shown in FIG. 2A, a waveform width of the reset signal waveform RW of the reset signal RS is smaller than a waveform width of the first scan signal waveform SW1 of the scan signal SS. Moreover, in the embodiment of the disclosure, in the reset period RP1, the first transistor M1 and the third transistor M3 can be first turned on, and then turned off. The first transistor M1 can be turned off faster than the transistor M3. Thus, the falling edge of the reset signal waveform RW of the reset signal RS can occur earlier than the falling edge of the first scan signal waveform SW1 of the scan signal SS in the time period as shown in FIG. 2A. In addition, in the embodiment of the disclosure, during the scan period SP1 of the sensing frame F1, the control terminal of the transistor M3 receives a second scan signal waveform SW2 of the scan signal SS.

Specifically, in the reset period RP1 of the sensing frame F1, the transistor M1 and the transistor M3 are turned on during the period from time t0 to time t1, a node voltage V_BE of the node BE may be reset to the reset voltage Vrst, and a node voltage V_P of the node P may be charged to the data voltage Vdata1 (Dark state), where the data voltage Vdata1 is an output voltage of the node P when the sensing pixel 111 is in the dark state. Then, during the period between time t1 and time t4 (include the exposure period EP1 between time t2 and time t3), the transistor M1 and transistor M3 are turned off, and the node BE and the node P are in floating state. Moreover, since the sensing pixel 111 is in the dark state, the photosensitive element PD does not generate the photo current. There may have a leakage current from the first terminal to the second terminal of the transistor M2, so that the node voltage V_P of the node P may be raised during the period of time t1 to time t4. During the scan period SP1 of the sensing frame F1, due to the transistor M3 is turned on and the transistors M1 is turned off from time t4 to time t5, the transistor M2 is operated as the source follower, and the node voltage V_P of the node P may be charged to the data voltage Vdata1 again. That is, as shown in following equation (1), the voltage difference (parameter $\Delta V_P$) of the node voltage V_P of the node P between the reset period RP1 and the scan period SP1 may be canceled, because the parameter $V_{P\_reset}$ and the parameter $V_{P\_scan}$ equal to the data voltage Vdata1. In the following equation (1), the parameter $V_{P\_reset}$ represents the node voltage V_P of the node P in the reset period RP1, and the parameter $V_{P\_scan}$ represents the node voltage V_P of the node P in the scan period SP1.

$$\Delta V_P = V_{P\_reset} - V_{P\_scan} \qquad \text{equation (1)}$$

Moreover, as shown in following equation (2), since the voltage difference (parameter $\Delta V_{BE}$) of the node voltage V_BE of the node BE between the reset period RP1 and the scan period SP1 depends on the voltage difference (parameter $\Delta V_P$) of the node voltage V_P of the node P between the reset period RP1 and the scan period SP1, the parameter $\Delta V_{BE}$ causing the output loss may also be canceled or decreased, because the parameter $\Delta V_P$ may equal to zero. In the following equation (2), the parameter $\Delta V_{BE}$ represents the voltage difference of the node voltage V_BE of the node BE between the reset period RP1 and the scan period SP1 caused by the coupling of the node P. In the following equation (2), the parameter M2_Cgs is the parasitic capacitance between the control terminal and the second terminal of the transistor M2, and the parameter $C_{PD}$ represents an intrinsic capacitance formed by the structure of the photosensitive element PD.

$$\Delta V_{BE} = \Delta V_P \times \frac{M2\_Cgs}{C_{PD} + M2\_Cgs} \qquad \text{equation (2)}$$

Then, during the period between time t5 and time t8 (include the frame gap period FG1 between time t6 and time t7), the transistor M1 and transistor M3 are turned off, and the node BE and the node P are in floating state again. There may have the leakage current from the first terminal to the second terminal of the transistor M2, so that the node voltage V_P of the node P may be raised during the time t5 to time t8. In the next reset period RP2 of the next sensing frame F2, due to the transistor M1 and the transistor M3 are turned on during the period of time t8 to time t9, the node voltage V_BE of the node BE may be reset to the reset voltage Vrst again, and the node voltage V_P of the node P may be charged to the data voltage Vdata1 again. In other word, since the node voltage V_P of the node P may be charged to the data voltage Vdata1 during the period of time t8 to time t9, so that the influence of the leakage current from time t5 to time t8 for the node voltage V_P of the node P can be alleviated. Therefore, the output loss of the sensing pixel 111 operating in the dark state can be effectively improved. In addition, the voltage changes of the node V_BE of the node BE and the node voltage V_P of the node P from time t9 to time t13 are similar to above description relating from time t1 to time t5, so it is not repeated here.

Figure 2C:
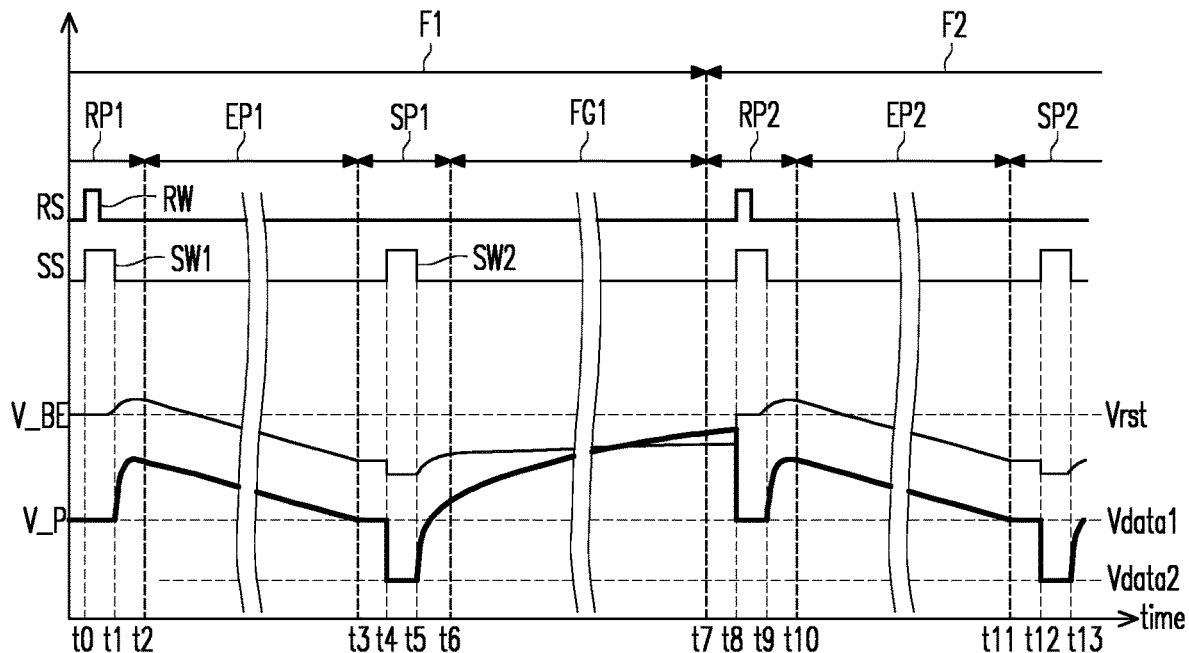
FIG. 2C illustrates a timing diagram of the operation of the sensing pixel of FIG. 1B in the bright state according to an embodiment of the disclosure.

FIG. 2C illustrates a timing diagram of the operation of the sensing pixel of FIG. 1B in the bright state according to an embodiment of the disclosure. Referring to FIG. 1A, FIG. 1B, and FIG. 2C, the following embodiment will take the one sensing pixel 111 of FIG. 1B in the bright state as an example. In the embodiment of the disclosure, the timings of the reset signal RS and the scan signal SS are same as the above embodiment of FIG. 2B, so it is not repeated here. Specifically, in the reset period RP1 of the sensing frame F1, due to the transistor M1 and the transistor M3 are turned on during the period from time t0 to time t1, a node voltage V_BE of the node BE may be reset to the reset voltage Vrst, and a node voltage V_P of the node P may be charged to the data voltage Vdata1. Then, during the period between time t1 and time t4 (include the exposure period EP1 between time t2 and time t3), the transistor M1 and transistor M3 are turned off, and the node BE and the node P are in floating state. Since the sensing pixel 111 is in the bright state, the photosensitive element PD may generate the photo current to the node BE, so that the node voltage V_BE is decreased. Correspondingly, since the node voltage V_P of the node P is coupled with the node voltage V_BE of the node BE, the node voltage V_P of the node P is also decreased. In the embodiment of the disclosure, during the period of time t1 to time t4, the voltage difference of the node voltage V_P of the node P is mainly affected by the capacitive coupling effect from the voltage difference of the node voltage V_BE of the node BE, rather than affected by the leakage current from the first terminal to the second terminal of the transistor M2.

During the scan period SP1 of the sensing frame F1, due to the transistor M3 is turned on and the transistors M1 is turned off from time t4 to time t5, the transistor M2 is operated as the source follower, and the node voltage V_P of the node P be outputted, where the node voltage V_P of the node P may be charged to the data voltage Vdata2 (Bright state). Therefore, the readout circuit 140 may readout the sensing result (data) according to the data voltage Vdata2, where the sensing result (data) corresponds to the voltage difference (as parameter $\Delta V_{P\_exposure}$) of the data voltage Vdata2 and the data voltage Vdata1 between the reset period RP1 and the scan period SP1. Furthermore, similar to the dark state of the above embodiment of FIG. 2B, as shown in following equation (3), the parameter $\Delta V_P$ can be canceled, and only remain the parameter $$\Delta V_{P\_exposure} \cdot \Delta V_P + \Delta V_{P\_exposure} = V_{P\_reset} - V_{P\_scan} \quad \text{equation (3)}$$

Then, during the period between time t5 and time t8 (include the frame gap period FG1 between time t6 and time t7), the transistor M1 and transistor M3 are turned off, and the node BE and the node P are in floating state again. There may have the leakage current from the first terminal to the second terminal of the transistor M2, so that the node voltage V_P of the node P may be raised during the period of time t5 to time t8. In the reset period RP2 of the sensing frame F2, due to the transistor M1 and the transistor M3 are turned on during the period of time t8 to time t9, the node voltage V_BE of the node BE may be reset to the reset voltage Vrst again, and a node voltage V_P of the node P may be charged to the data voltage Vdata1 again. In other word, since the node voltage V_P of the node P may be charged to the data voltage Vdata1 during the period of time t8 to time t9, so that the influence of the leakage current from time t5 to time t8 for the node voltage V_P of the node P can be alleviated. Therefore, the output loss of the sensing pixel 111 operating in the bright state can be effectively improved. In addition, the voltage changes of the node V_BE of the node BE and the node voltage V_P of the node P from time t9 to time t13 are similar to above description relating from time t1 to time t5, so it is not repeated here.

Figure 2D:
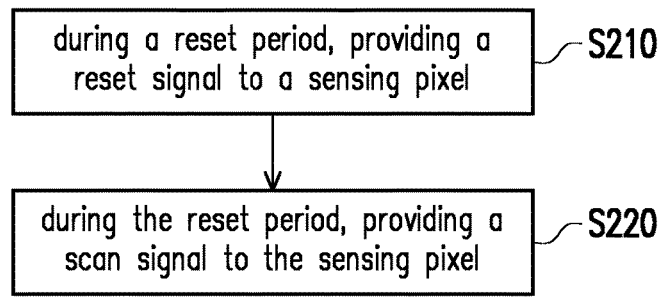
FIG. 2D illustrates a flowchart of the control method according to an embodiment of the disclosure.

FIG. 2D illustrates a flowchart of the control method according to an embodiment of the disclosure. Each one of the sensing pixels 111_1 to 111_M of FIG. 1A may execute the following steps S210 and S220 to reach the effect of improving the output loss. Referring to FIG. 1B, FIG. 2B and FIG. 2D, the following embodiment will take the one sensing pixel 111 of FIG. 1B in the dark state as an example. In step S210, during the reset period RP1, a reset signal RS is provided to the sensing pixel 111. During the reset period RP1, the control terminal of the first transistor M1 may receive the reset signal RS having the reset signal waveform RW. In step S220, during the reset period RP1, a scan signal SS is provided to the sensing pixel 111. During the reset period RP1, the control terminal of the third transistor M3 may receive the scan signal SS having the first scan signal waveform SW1. In the embodiment of the disclosure, the reset signal waveform RW of the reset signal RS and the first scan signal waveform SW1 of the scan signal SS are at least partially overlapped. That is to say, the sensing pixel 111 may effectively alleviate the influence of the leakage current from the first terminal to the second terminal of the transistor M2, so as to charge the node voltage of the node P to the data voltage Vdata1, and the node voltage of the node P may be lower than the node voltage of the node BE. In the embodiment of the disclosure, during the scan period SP1, the control terminal of the third transistor M3 may receive the scanning signal SS having the second scan signal waveform SW2. Therefore, since the voltage difference of the node voltage of the node P between the reset period RP1 and the scan period SP1 caused by the leakage current may be canceled or decreased, and the voltage difference of the node voltage of the node BE between the reset period RP1 and the scan period SP1 caused by the coupling of the node P causing the output loss may also be canceled or decreased, the output loss of the sensing pixel 111 operating in the dark state can be effectively improved. In addition, the control method of FIG. 2D may also be adapted to the sensing pixel 111 in the bright state as the above embodiment of FIG. 2C. Accordingly, the each one of the sensing pixels 111_1 to 111_M of FIG. 1A may execute the following steps S210 and S220 to reach the effect of improving the output loss in the dark state or the bright state.

Specifically, in some embodiments, referring to FIG. 2B and FIG. 2D, a sensing frame F1 (one frame) includes a reset period RP1, an exposure period EP1, a scan period SP1, and a frame gap period FG1. During the sensing frame F1, the method further includes providing the scan signal SS to the sensing pixel, and the scan signal SS includes a second scan signal waveform SW2 not overlapping with the first scan signal waveform SW1. In some embodiments, during the scan period SP1, the method further includes reading out a sensing signal from the third transistor M3.

Figure 3:
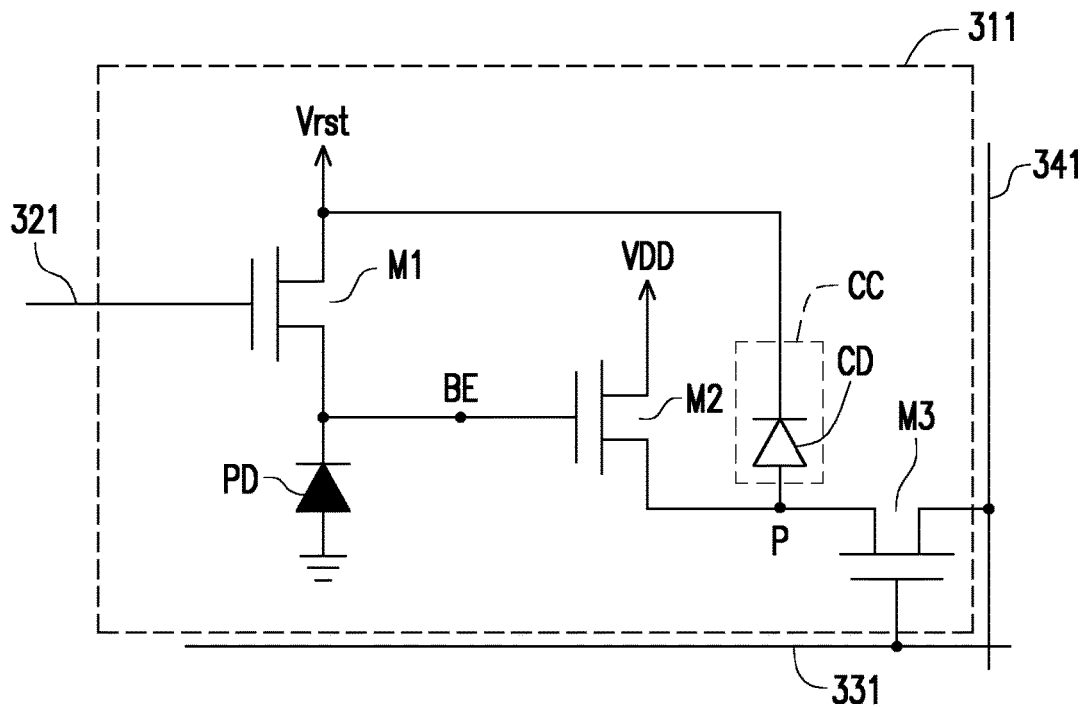
FIG. 3 illustrates a schematic diagram of a sensing pixel according to a second embodiment of the disclosure.

FIG. 3 illustrates a schematic diagram of a sensing pixel according to a second embodiment of the disclosure. Referring to FIG. 3, the circuit architecture of each of the sensing pixels 111_1 to 111_M of FIG. 1A may be the same as the circuit architecture of the sensing pixel 311 of FIG. 3. The sensing pixel 311 includes at least three transistors, that is, a first transistor M1, a second transistor M2, and a third transistor M3, a photosensitive element PD and a clamp circuit CC. The clamp circuit CC includes a clamp diode CD. In the embodiment of the disclosure, the sensing pixel 311 may be a 3T architecture of an active pixel sensor, but the disclosure is not limited thereto. In the embodiment of the disclosure, a first terminal of the transistor M1 is coupled to a reset voltage Vrst, and a second terminal of the transistor M1 is coupled to a first terminal of the photosensitive element PD. A control terminal of the transistor M1 is coupled to a reset signal line 321, where the reset signal line 321 may be one of the reset signal lines 121_1 to 121_N of FIG. 1A. A second terminal of the photosensitive element PD is coupled to a ground voltage. A control terminal of the transistor M2 is coupled to the first terminal of the photosensitive element PD, and the first terminal of the transistor M2 is coupled to a power supply voltage (VDD), but the disclosure is not limited thereto. In one embodiment of the disclosure, the first terminal of the transistor M2 may be coupled to power supply voltage. A first terminal of the transistor M3 is coupled to a second terminal of transistor M2, and a control terminal of the transistor M3 is coupled to a scan signal line 331, where the scan signal line 331 may be one of the scan signal lines 131_1 to 131_N of FIG. 1A. A second terminal of the transistor M3 is coupled to an output signal line 341, where the output signal line 341 may be one of the output signal lines 141_1 to 141_P of FIG. 1A. A first terminal of the clamp diode CD is coupled to the reset voltage Vrst. A second terminal of the clamp diode CD is coupled to the second terminal of the transistor M2 and the first terminal of the transistor M3. The clamp diode CD is coupled between the reset voltage Vrst and the second transistor M2. In addition, in one embodiment of the disclosure, the sensing pixel 311 may include other clamp circuit coupled to the second terminal of the transistor M2, rather than the clamp diode CD.

Specifically, in the embodiment of the disclosure, the control terminal of the transistor M1 may be configured to receive a reset signal through the reset signal line 321, so as to reset the photosensitive element PD and a node voltage of a node BE, where the node BE is located between the first terminal of the photosensitive element PD and the control terminal of the transistor M2. The control terminal of the transistor M3 may be configured to receive a scan signal through the scan signal line 331. According to some embodiments, when the transistor M3 is turned on, the transistor M2 is operated as the source follower circuit, and a node voltage of the node P can be readout from the output signal line 341 through the transistor M3, where the node P is located between the second terminal of the transistor M2 and the first terminal of the transistor M3. In the embodiment of the disclosure, the node voltage of the node P depends on the node voltage of a node BE. When the transistor M1 and transistor M3 are turned off, since the node P is in floating state and there may have the leakage current from the first terminal to the second terminal of the transistor M2, the node voltage of node P may be raised. In some embodiments, the node voltage of node P is smaller than clamp voltage Vrst+VF. VF is the voltage of the clamp circuit CD. The node voltage of the node BE may also be limitedly raised from the coupling of the voltage of node P.

Figure 4A:
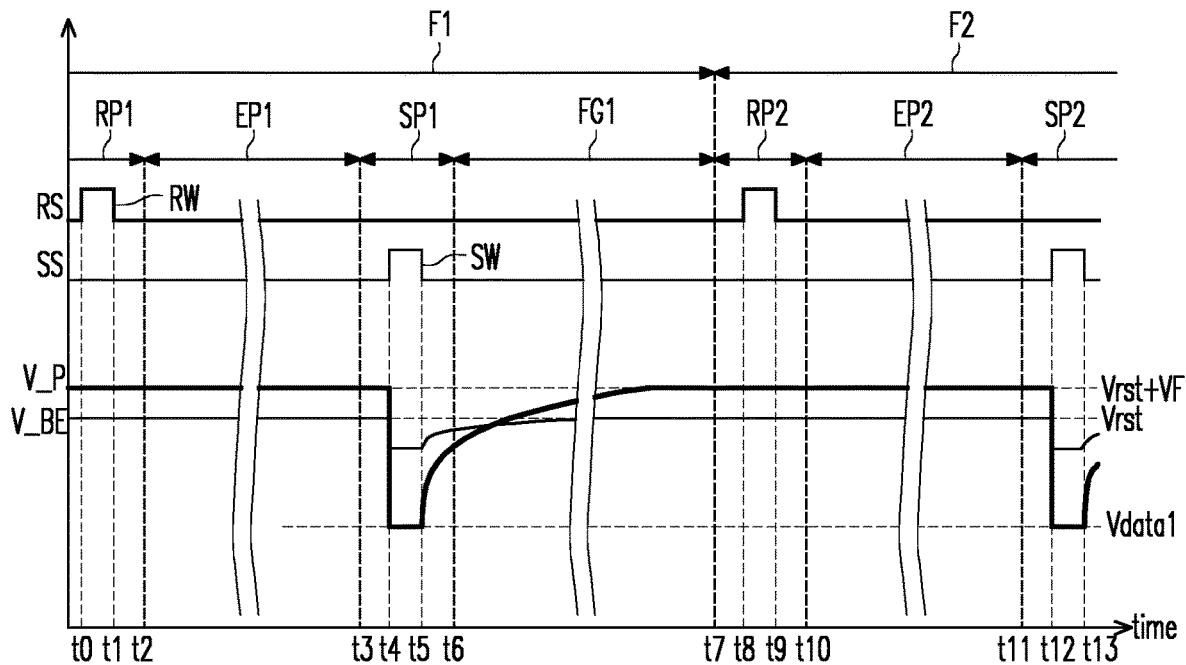
FIG. 4A illustrates a timing diagram of the operation of the sensing pixel of FIG. 3 in the dark state according to an embodiment of the disclosure.

FIG. 4A illustrates a timing diagram of the operation of the sensing pixel of FIG. 3 in the dark state according to an embodiment of the disclosure. Referring to FIG. 1A, FIG. 3, and FIG. 4A, the following embodiment will take the one sensing pixel 311 of FIG. 3 in the dark state as an example. In the embodiment of the disclosure, the control terminal of the transistor M1 receives a reset signal RS and the control terminal of the transistor M3 receives a scan signal SS. During the reset period RP1 of the sensing frame F1, the reset signal RS has a waveform width of a reset signal waveform RW. During the scan period SP1 of the sensing frame F1, the scan signal SS has a waveform width of a scan signal waveform SW.

Specifically, in the reset period RP1 of the sensing frame F1, due to the transistor M1 is turned on during the period from time t0 to time t1, the node voltage V_BE of the node BE may be reset to the reset voltage Vrst, and the node voltage V_P of the node P may be clamped with a clamp voltage Vrst+VF or lower, where the clamp voltage Vrst+VF is lower than the power supply voltage VDD. Then, during the period between time t1 and time t4 (include the exposure period EP1 between time t2 and time t3), the transistor M1 and transistor M3 are turned off, and the node BE and the node P are in floating state. Since the sensing pixel 311 is in the dark state, the photosensitive element PD does not generate the photo current. Although, there may have a leakage current from the first terminal to the second terminal of the transistor M2, so that the node voltage V_P of the node P may be raised during the period of the scan signal waveform SW falling edge of previous sensing frame to time t4. The node voltage V_P of the node P is still clamped with the clamp voltage Vrst+VF or lower.

During the scan period SP1 of the sensing frame F1, due to the transistor M3 is turned on and the transistors M1 is turned off from time t4 to time t5, the transistor M2 is operated as the source follower, and the node voltage V_P of the node P may be charged to the data voltage Vdata1. That is, the voltage difference (Same as the definition of the above parameter $\Delta V_P$) of the node voltage V_P of the node P between the reset period RP1 and the scan period SP1 can be effectively suppressed by the clamp diode CD. Moreover, since the voltage difference (Same as the definition of the above parameter $\Delta V_{BE}$) of the node voltage V_BE of the node BE between the reset period RP1 and the scan period SP1 depends on the voltage difference of the node voltage V_P of the node P between the reset period RP1 and the scan period SP1, the voltage difference of the node voltage V_BE of the node BE between the reset period RP1 and the scan period SP1 can be effectively reduced correspondingly, thus the influence of the output loss may be effectively reduce.

Then, during the period between the time t5 and time t8 (include the frame gap period FG1 between the time t6 and the time t7), the transistor M1 and transistor M3 are turned off, and the node BE and the node P are in floating state again. Although, there may have the leakage current from the first terminal to the second terminal of the transistor M2, so that the node voltage V_P of the node P may be raised during the time t5 to time t8. The node voltage V_P of the node P is still clamped with the clamp voltage Vrst+VF or lower. Moreover, in the reset period RP2 of the sensing frame F2, due to the transistor M1 is turned on during the period of time t8 to time t9, the node voltage V_BE of the node BE may be reset to the reset voltage Vrst again, and a node voltage V_P of the node P may be still clamped with the clamp voltage Vrst+VF or lower, so that the influence of the capacitive coupling effect between the node BE and the node P can be effectively suppressed. Therefore, the output loss of the sensing pixel 311 operating in the dark state can be effectively improved. In addition, the voltage changes of the node V_BE of the node BE and the node voltage V_P of the node P from time t9 to time t13 are similar to above description relating from time t1 to time t5, so it is not repeated here.

Figure 4B:
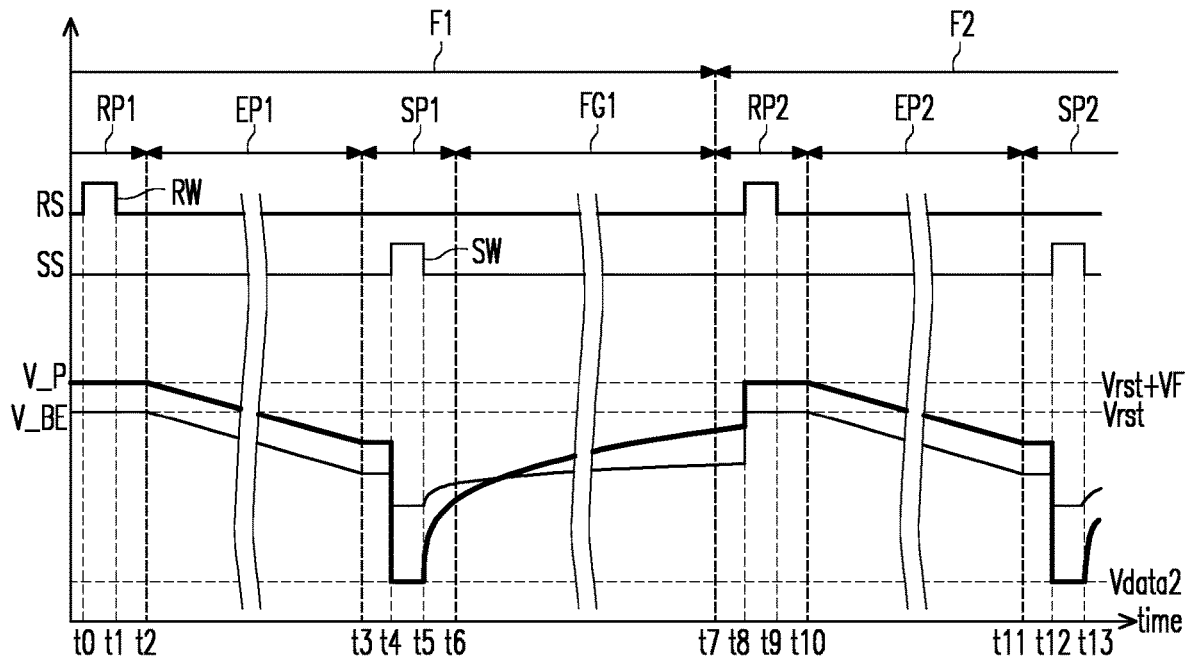
FIG. 4B illustrates a timing diagram of the operation of the sensing pixel of FIG. 3 in the bright state according to an embodiment of the disclosure.

FIG. 4B illustrates a timing diagram of the operation of the sensing pixel of FIG. 3 in the bright state according to an embodiment of the disclosure. Referring to FIG. 1A, FIG. 3, and FIG. 4B, the following embodiment will take the one sensing pixel 311 of FIG. 3 in the bright state as an example. In the embodiment of the disclosure, the timings of the reset signal RS and the scan signal SS are same as the above embodiment of FIG. 4A, so it is not repeated here. Specifically, in the reset period RP1 of the sensing frame F1, due to the transistor M1 is turned on during the period from time t0 to time t1, the node voltage V_BE of the node BE may be reset to the reset voltage Vrst, and the node voltage V_P of the node P may be clamped with the clamp voltage Vrst+VF or lower, where the clamp voltage Vrst+VF is lower than the power supply voltage VDD. Then, during the period between time t1 and time t4 (include the exposure period EP1 between time t2 and time t3), the transistor M1 and transistor M3 are turned off, and the node BE and the node P are in floating state. Since the sensing pixel 311 is in the bright state, the photosensitive element PD may generate the photo current to the node BE, so that the node voltage V_BE is decreased. Correspondingly, since the node voltage V_P of the node P depends on the node voltage V_BE of the node BE, the node voltage V_P of the node P is also decreased.

During the scan period SP1 of the sensing frame F1, due to the transistor M3 is turned on and the transistors M1 is turned off from time t4 to time t5, the transistor M2 is operated as the source follower, and the node voltage V_P of the node P be outputted, where the node voltage V_P of the node P may be charged to the data voltage Vdata2 (Bright state). Therefore, the readout circuit 140 may readout the sensing result (data) according to the data voltage Vdata2, where the sensing result corresponds to the voltage change of the node voltage V_P of the node P at time t4. Furthermore, similar as the dark state of the above embodiment of FIG. 4A, the voltage difference of the node voltage V_BE of the node BE between the reset period RP1 and the scan period SP1 causing by the influence of the capacitive coupling effect from the node voltage V_P of the node P can be effectively suppressed correspondingly.

Then, during the period between the time t5 and time t8 (include the frame gap period FG1 between the time t6 and the time t7), the transistor M1 and transistor M3 are turned off, and the node BE and the node P are in floating state again. Although, there may have the leakage current from the first terminal to the second terminal of the transistor M2, so that the node voltage V_P of the node P may be raised during the time t5 to time t8. The node voltage V_P of the node P can't exceed the clamp voltage Vrst+VF. Moreover, in the reset period RP2 of the sensing frame F2, due to the transistor M1 is turned on during the period of time t8 to time t9, the node voltage V_BE of the node BE may be reset to the reset voltage Vrst again, and a node voltage V_P of the node P may be still clamped with the clamp voltage Vrst+VF or lower, so that the influence of the capacitive coupling effect between the node BE and the node P can be effectively suppressed. Therefore, the output loss of the sensing pixel 311 operating in the bright state can be effectively improved. In addition, the voltage changes of the node V_BE of the node BE and the node voltage V_P of the node P from time t9 to time t13 are similar to above description relating from time t1 to time t5, so it is not repeated here.

Figure 5A:
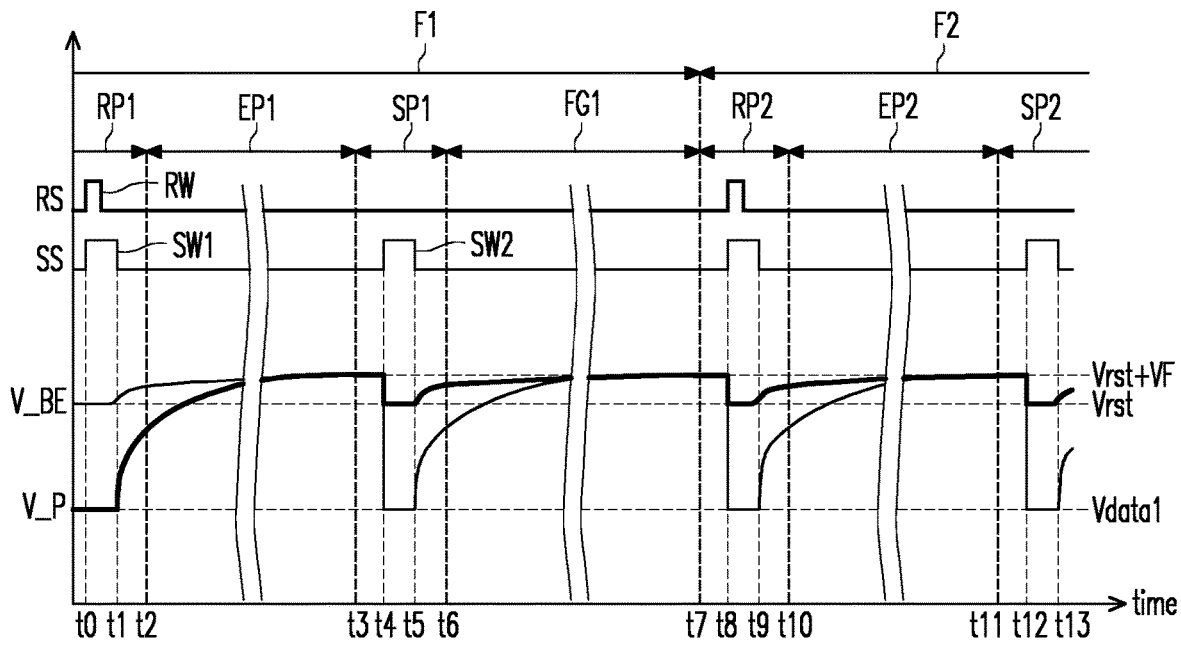
FIG. 5A illustrates a timing diagram of the operation of the sensing pixel of FIG. 3 in the dark state according to another embodiment of the disclosure.

FIG. 5A illustrates a timing diagram of the operation of the sensing pixel of FIG. 3 in the dark state according to another embodiment of the disclosure. Referring to FIG. 1A, FIG. 3, and FIG. 5A, the following embodiment will take the one sensing pixel 311 of FIG. 3 in the dark state as an example. In the embodiment of the disclosure, the timings of the reset signal RS and the scan signal SS are same as the above embodiment of FIG. 2B, so it is not repeated here. Specifically, in the reset period RP1 of the sensing frame F1, due to the transistor M1 and the transistor M3 are turned on during the period from time t0 to time t1, the node voltage V_BE of the node BE may be reset to the reset voltage Vrst, and the node voltage V_P of the node P may be charged to the reset voltage Vdata1 (Dark state). Then, during the period between time t1 and time t4 (include the exposure period EP1 between time t2 and time t3), the transistor M1 and transistor M3 are turned off, and the node BE and the node P are in floating state. Since the sensing pixel 311 is in the dark state, the photosensitive element PD does not generate the photo current. Although, there may have a leakage current from the first terminal to the second terminal of the transistor M2, so that the node voltage V_P of the node P may be raised during the period of time t1 to time t4. The node voltage V_P of the node P can't exceed the clamp voltage Vrst+VF.

During the scan period SP1 of the sensing frame F1, due to the transistor M3 is turned on and the transistors M1 is turned off from time t4 to time t5, the transistor M2 is operated as the source follower, and the node voltage V_P of the node P may be charged to the data voltage Vdata1. That is, the voltage difference (Same as the definition of the above parameter $\Delta V_P$) of the node voltage V_P of the node P between the reset period RP1 and the scan period SP1 can be effectively suppressed by the clamp diode CD. Moreover, since the voltage difference (Same as the definition of the above parameter $\Delta V_{BE}$) of the node voltage V_BE of the node BE between the reset period RP1 and the scan period SP1 depends on the voltage difference of the node voltage V_P of the node P between the reset period RP1 and the scan period SP1, the voltage difference of the node voltage V_BE of the node BE between the reset period RP1 and the scan period SP1 can be canceled or decreased correspondingly, thus the influence of the output loss may be canceled or alleviated.

Then, during the period between the time t5 and time t8 (include the frame gap period FG1 between the time t6 and the time t7), the transistor M1 and transistor M3 are turned off, and the node BE and the node P are in floating state again. Although, there may have the leakage current from the first terminal to the second terminal of the transistor M2, so that the node voltage V_P of the node P may be raised during the time t5 to time t8. The node voltage V_P of the node P can't exceed the clamp voltage Vrst+VF. Moreover, in the reset period RP2 of the sensing frame F2, due to the transistor M1 is turned on during the period of time t8 to time t9, the node voltage V_BE of the node BE may be reset to the reset voltage Vrst again, and the node voltage V_P of the node P may be charged to the data voltage Vdata1 again. In other word, since the node voltage V_P of the node P may be charged to the data voltage Vdata1 during the period of time t8 to time t9, so that the influence of the leakage current from time t5 to time t8 for the node voltage V_P of the node P can be alleviated. Therefore, the output loss of the sensing pixel 311 operating in the dark state can be effectively improved. In addition, the voltage changes of the node V_BE of the node BE and the node voltage V_P of the node P from time t9 to time t13 are similar to above description relating from time t1 to time t5, so it is not repeated here.

Figure 5B:
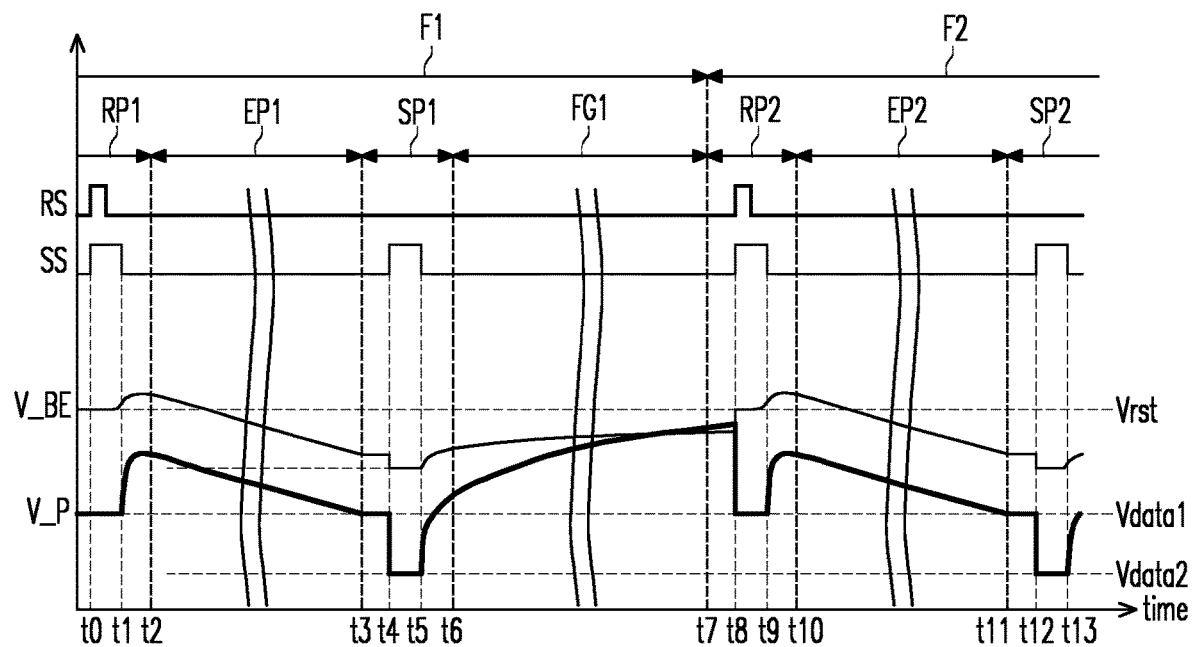
FIG. 5B illustrates a timing diagram of the operation of the sensing pixel of FIG. 3 in the bright state according to another embodiment of the disclosure.

FIG. 5B illustrates a timing diagram of the operation of the sensing pixel of FIG. 3 in the bright state according to another embodiment of the disclosure. Referring to FIG. 1A, FIG. 3, and FIG. 5B, the following embodiment will take the one sensing pixel 311 of FIG. 3 in the bright state as another example. In the embodiment of the disclosure, the timings of the reset signal RS and the scan signal SS are same as the above embodiment of FIG. 2C, so it is not repeated here. Specifically, in the reset period RP1 of the sensing frame F1, due to the transistor M1 and the transistor M3 are turned on during the period from time t0 to time t1, the node voltage V_BE of the node BE may be reset to the reset voltage Vrst, and the node voltage V_P of the node P may be charged to the reset voltage Vdata1 (Dark state). Then, during the period between time t1 and time t4 (include the exposure period EP1 between time t2 and time t3), the transistor M1 and transistor M3 are turned off, and the node BE and the node P are in floating state. Since the sensing pixel 311 is in the bright state, the photosensitive element PD may generate the photo current to the node BE, so that the node voltage V_BE is decreased. Correspondingly, since the node voltage V_P of the node P depends on the node voltage V_BE of the node BE, the node voltage V_P of the node P is also decreased. According to some embodiments, in the embodiment of the disclosure, the voltage difference of the node voltage V_P of the node P during the period of time t1 to time t4 is mainly affected by the capacitive coupling effect from the voltage difference of the node voltage V_BE of the node BE during the period of time t1 to time t4 rather than the leakage current from the first terminal to the second terminal of the transistor M2.

During the scan period SP1 of the sensing frame F1, due to the transistor M3 is turned on and the transistors M1 is turned off from time t4 to time t5, the transistor M2 is operated as the source follower, and the node voltage V_P of the node P be outputted, where the node voltage V_P of the node P may be charged to the data voltage Vdata2 (Bright state). Therefore, the readout circuit 140 may readout the sensing result (data) according to the data voltage Vdata2, where the sensing result corresponds to the voltage change of the node voltage V_P of the node P at time t4. Furthermore, similar as the dark state of the above embodiment of FIG. 5A, the voltage difference of the node voltage V_BE of the node BE between the reset period RP1 and the scan period SP1 causing by the influence of the capacitive coupling effect from the node voltage V_P of the node P can be effectively suppressed correspondingly.

Then, during the period between the time t5 and time t8 (include the frame gap period FG1 between the time t6 and the time t7), the transistor M1 and transistor M3 are turned off, and the node BE and the node P are in floating state again. Although, there may have the leakage current from the first terminal to the second terminal of the transistor M2, so that the node voltage V_P of the node P may be raised during the time t5 to time t8. The node voltage V_P of the node P can't exceed the clamp voltage Vrst+VF. Moreover, in the reset period RP2 of the sensing frame F2, due to the transistor M1 and the transistor M3 are turned on during the period of time t8 to time t9, the node voltage V_BE of the node BE may be reset to the reset voltage Vrst again, and a node voltage V_P of the node P may be charged to the data voltage Vdata1, so that the influence of the capacitive coupling effect between the node BE and the node P can be effectively suppressed. Therefore, the output loss of the sensing pixel 311 operating in the bright state can be effectively improved. In addition, the voltage changes of the node V_BE of the node BE and the node voltage V_P of the node P from time t9 to time t13 are similar to above description relating from time t1 to time t5, so it is not repeated here.

Figure 6:
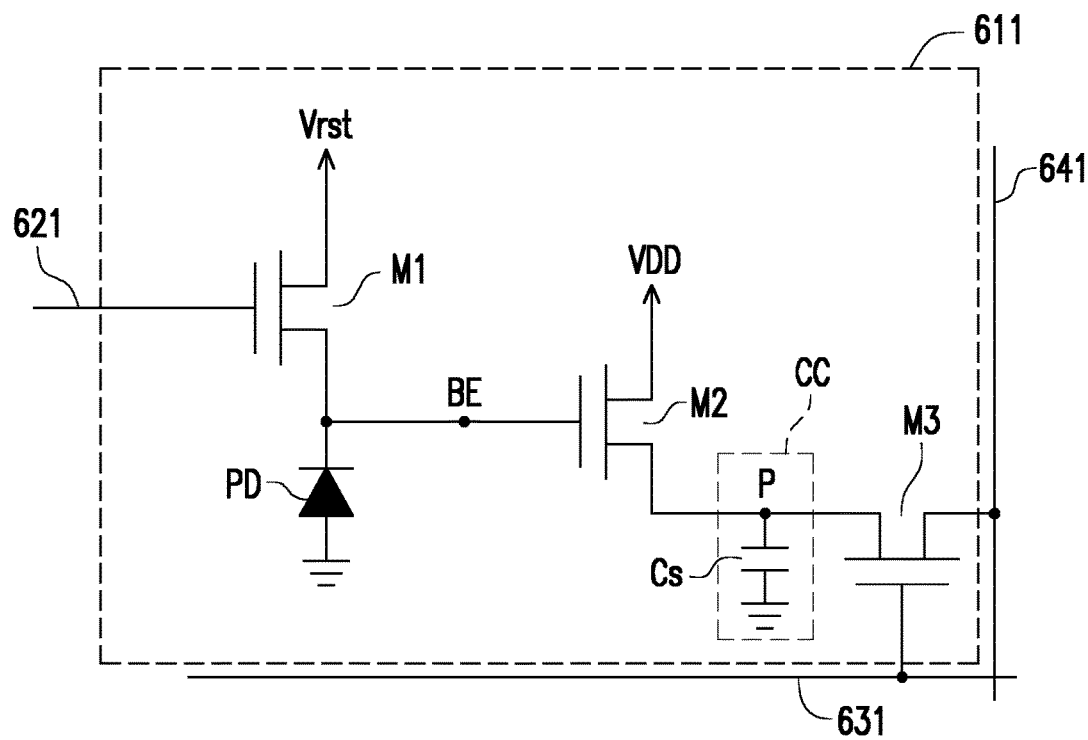
FIG. 6 illustrates a schematic diagram of a sensing pixel according to a third embodiment of the disclosure.

FIG. 6 illustrates a schematic diagram of a sensing pixel according to a third embodiment of the disclosure. Referring to FIG. 6, the circuit architecture of each of the sensing pixels 111_1 to 111_M of FIG. 1A may be the same as the circuit architecture of the sensing pixel 611 of FIG. 6. The sensing pixel 611 includes at least three transistors M1 to M3, a photosensitive element PD and a clamp circuit CC. The clamp circuit CC includes a storage capacitor Cs. In the embodiment of the disclosure, the sensing pixel 611 may be a 3T architecture of an active pixel sensor, but the disclosure is not limited thereto. In the embodiment of the disclosure, a first terminal of the transistor M1 is coupled to a reset voltage Vrst, and a second terminal of the transistor M1 is coupled to a first terminal of the photosensitive element PD. A control terminal of the transistor M1 is coupled to a reset signal line 621, where the reset signal line 621 may be one of the reset signal lines 121_1 to 121_N of FIG. 1A. A second terminal of the photosensitive element PD is coupled to a ground voltage. A control terminal of the transistor M2 is coupled to the first terminal of the photosensitive element PD, and the first terminal of the transistor M2 is coupled to a power supply voltage (VDD), but the disclosure is not limited thereto. In one embodiment of the disclosure, the first terminal of the transistor M2 may be coupled to power supply voltage. A first terminal of the transistor M3 is coupled to a second terminal of transistor M2, and a control terminal of the transistor M3 is coupled to a scan signal line 631, where the scan signal line 631 may be one of the scan signal lines 131_1 to 131_N of FIG. 1A. A second terminal of the transistor M3 is coupled to an output signal line 641, where the output signal line 641 may be one of the output signal lines 141_1 to 141_P of FIG. 1A. A first terminal of the storage capacitor Cs is coupled to the second terminal of the transistor M2 and the first terminal of the transistor M3. A second terminal of the storage capacitor Cs is coupled to the ground voltage. The storage capacitor Cs is coupled between the second transistor M3 and the ground voltage.

Specifically, in the embodiment of the disclosure, the control terminal of the transistor M1 may be configured to receive a reset signal through the reset signal line 621, so as to reset the photosensitive element PD and a node voltage of a node BE, where the node BE is located between the first terminal of the photosensitive element PD and the control terminal of the transistor M2. The control terminal of the transistor M3 may be configured to receive a scan signal through the scan signal line 631. According to some embodiments, when the transistor M3 is turned on, the transistor M2 is operated as the source follower circuit, and a node voltage of the node P can be readout from the output signal line 641 through the transistor M3, where the node P is located between the second terminal of the transistor M2 and the first terminal of the transistor M3. In the embodiment of the disclosure, the node voltage of the node P depends on the node voltage of a node BE. When the transistor M1 and transistor M3 are turned off, since the node P is in floating state and there may have the leakage current from the first terminal to the second terminal of the transistor M2, the node voltage of node P may be raised, but the storage capacitor Cs can effectively suppress the raising of the node voltage of the node P. Based on the capacitance characteristic of the storage capacitor Cs, the storage capacitor Cs may effectively reduce the degree of voltage change of the node voltage of the node, and the node voltage of the node BE may also be limitedly raised from the coupling of the voltage of node P.

Figure 7A:
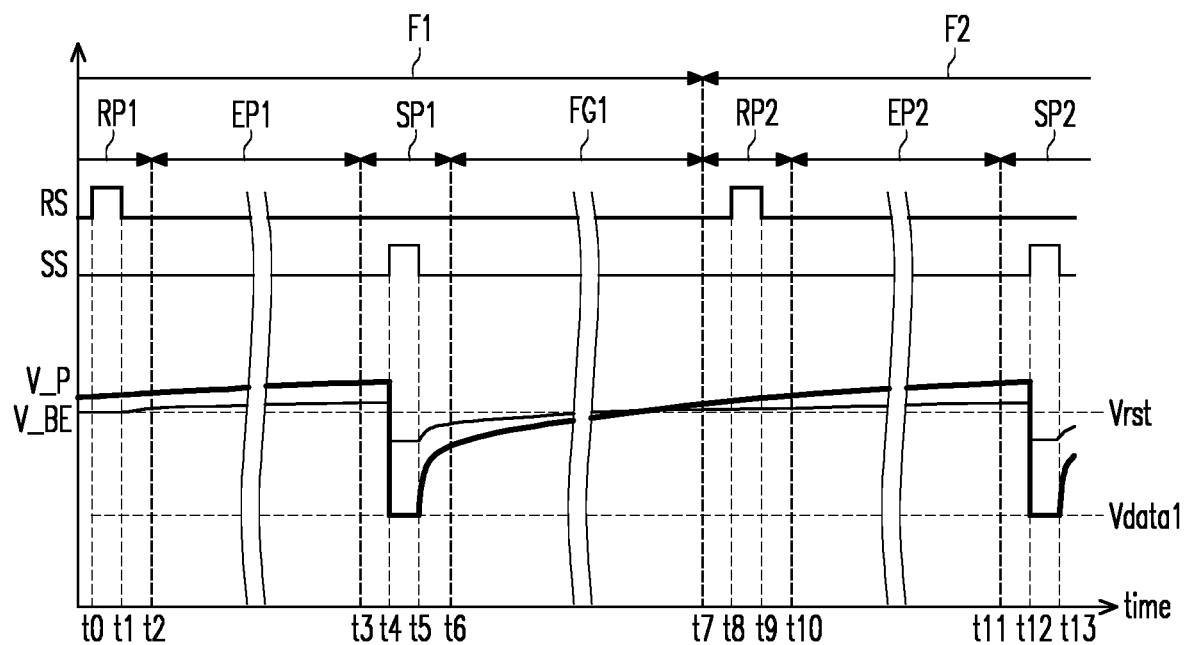
FIG. 7A illustrates a timing diagram of the operation of the sensing pixel of FIG. 6 in the dark state according to an embodiment of the disclosure.

FIG. 7A illustrates a timing diagram of the operation of the sensing pixel of FIG. 6 in the dark state according to an embodiment of the disclosure. Referring to FIG. 1A, FIG. 6, and FIG. 7A, the following embodiment will take the one sensing pixel 611 of FIG. 6 in the dark state as an example. In the embodiment of the disclosure, the timings of the reset signal RS and the scan signal SS are same as the above embodiment of FIG. 4A, so it is not repeated here. Specifically, in the reset period RP1 of the sensing frame F1, due to the transistor M1 is turned on during the period from time t0 to time t1, the node voltage V_BE of the node BE may be reset to the reset voltage Vrst, and the node voltage V_P of the node P may be raised by the leakage current from the first terminal to the second terminal of the transistor M2, but the storage capacitor Cs can effectively suppress the raising of the node voltage V_P of the node P. Then, during the period between time t1 and time t4 (include the exposure period EP1 between time t2 and time t3), the transistor M1 and transistor M3 are turned off, and the node BE and the node P are in floating state. Since the sensing pixel 611 is in the dark state, the photosensitive element PD does not generate the photo current. In the embodiment of the disclosure, there may have the leakage current from the first terminal to the second terminal of the transistor M2, but the node voltage V_P of the node P may be limitedly raised during the period of time t1 to time t4. Moreover, the node voltage V_BE of the node BE may also be limitedly raised during the period of time t1 to time t4.

During the scan period SP1 of the sensing frame F1, due to the transistor M3 is turned on and the transistors M1 is turned off from time t4 to time t5, the transistor M2 is operated as the source follower, and the node voltage V_P of the node P may be charged to the data voltage Vdata1. That is, the voltage difference (Same as the definition of the above parameter $\Delta V_P$) of the node voltage V_P of the node P between the reset period RP1 and the scan period SP1 can be effectively suppressed by the storage capacitor Cs. Moreover, since the voltage difference (Same as the definition of the above parameter $\Delta V_{BE}$) of the node voltage V_BE of the node BE between the reset period RP1 and the scan period SP1 depends on the voltage difference of the node voltage V_P of the node P between the reset period RP1 and the scan period SP1, the voltage difference of the node voltage V_BE of the node BE between the reset period RP1 and the scan period SP1 can be effectively reduced correspondingly, thus the influence of the output loss may be effectively reduce.

Then, during the period between the time t5 and time t8 (include the frame gap period FG1 between the time t6 and the time t7), the transistor M1 and transistor M3 are turned off, and the node BE and the node P are in floating state again. Although, there may have the leakage current from the first terminal to the second terminal of the transistor M2, so that the node voltage V_P of the node P may be raised during the time t5 to time t8. Due to the influence of the storage capacitor Cs, the node voltage V_P of the node P is also limitedly raised. Moreover, in the reset period RP2 of the sensing frame F2, due to the transistor M1 is turned on during the period of time t8 to time t9, the node voltage V_BE of the node BE may be reset to the reset voltage Vrst again, and a node voltage V_P of the node P may be still limitedly raised, so that the influence of the capacitive coupling effect between the node BE and the node P can be effectively suppressed. Therefore, the output loss of the sensing pixel 611 operating in the dark state can be effectively improved. In addition, the voltage changes of the node V_BE of the node BE and the node voltage V_P of the node P from time t9 to time t13 are similar to above description relating from time t1 to time t5, so it is not repeated here.

Figure 7B:
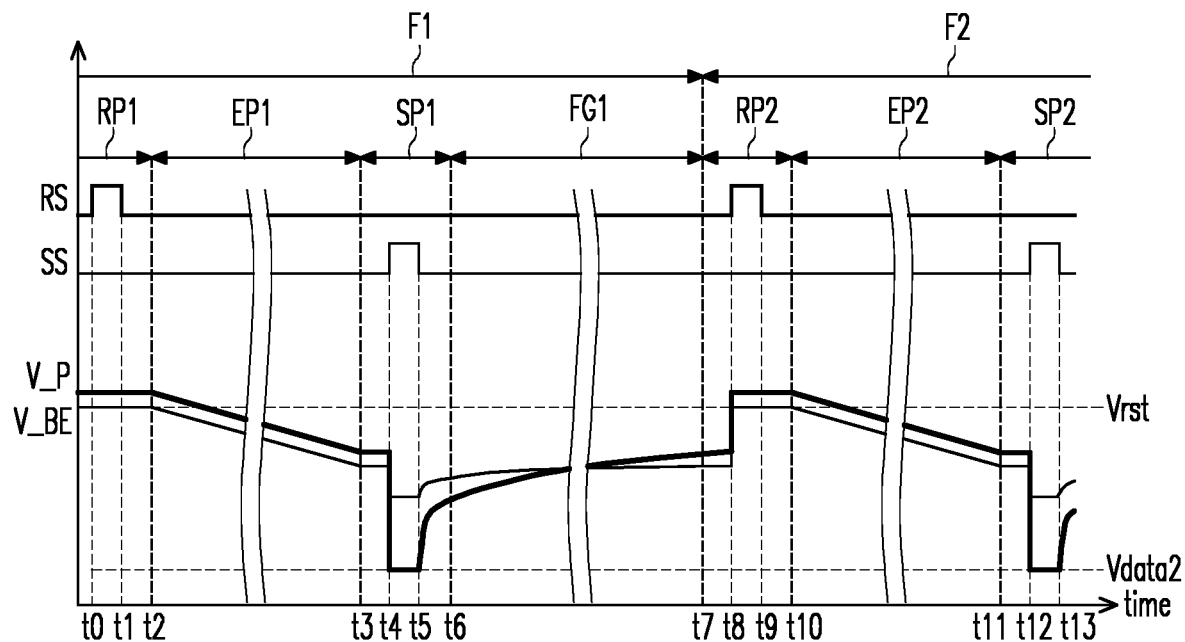
FIG. 7B illustrates a timing diagram of the operation of the sensing pixel of FIG. 6 in the bright state according to an embodiment of the disclosure.

FIG. 7B illustrates a timing diagram of the operation of the sensing pixel of FIG. 6 in the bright state according to an embodiment of the disclosure. Referring to FIG. 1A, FIG. 6, and FIG. 7B, the following embodiment will take the one sensing pixel 611 of FIG. 6 in the bright state as an example. In the embodiment of the disclosure, the timings of the reset signal RS and the scan signal SS are same as the above embodiment of FIG. 4A, so it is not repeated here. Specifically, in the reset period RP1 of the sensing frame F1, due to the transistor M1 is turned on during the period from time t0 to time t1, the node voltage V_BE of the node BE may be reset to the reset voltage Vrst, and the node voltage V_P of the node P may be raised by the leakage current from the first terminal to the second terminal of the transistor M2, but the storage capacitor Cs can effectively suppress the raising of the node voltage V_P of the node P. Then, during the period between time t1 and time t4 (include the exposure period EP1 between time t2 and time t3), the transistor M1 and transistor M3 are turned off, and the node BE and the node P are in floating state. Since the sensing pixel 611 is in the bright state, the photosensitive element PD may generate the photo current to the node BE, so that the node voltage V_BE is decreased. Correspondingly, since the node voltage V_P of the node P depends on the node voltage V_BE of the node BE, the node voltage V_P of the node P is also decreased. According to some embodiments, in the embodiment of the disclosure, the voltage difference of the node voltage V_P of the node P during the period of time t1 to time t4 is mainly affected by the capacitive coupling effect from the voltage difference of the node voltage V_BE of the node BE during the period of time t1 to time t4 rather than the leakage current from the first terminal to the second terminal of the transistor M2.

During the scan period SP1 of the sensing frame F1, due to the transistor M3 is turned on and the transistors M1 is turned off from time t4 to time t5, the transistor M2 is operated as the source follower, and the node voltage V_P of the node P be outputted, where the node voltage V_P of the node P may be charged to the data voltage Vdata2 (Bright state). Therefore, the readout circuit 140 may readout the sensing result (data) according to the data voltage Vdata2, where the sensing result corresponds to the voltage change of the node voltage V_P at time t4. Furthermore, similar as the dark state of the above embodiment of FIG. 7A, the voltage difference of the node voltage V_BE of the node BE between the reset period RP1 and the scan period SP1 causing by the influence of the capacitive coupling effect from the node voltage V_P of the node P can be effectively suppressed correspondingly.

Then, during the period between the time t5 and time t8 (include the frame gap period FG1 between the time t6 and the time t7), the transistor M1 and transistor M3 are turned off, and the node BE and the node P are in floating state again. Although, there may have the leakage current from the first terminal to the second terminal of the transistor M2, so that the node voltage V_P of the node P may be raised during the time t5 to time t8. Due to the influence of the storage capacitor Cs, the node voltage V_P of the node P is also limitedly raised. Moreover, in the reset period RP2 of the sensing frame F2, due to the transistor M1 is turned on during the period of time t8 to time t9, the node voltage V_BE of the node BE may be reset to the reset voltage Vrst again, and a node voltage V_P of the node P may be still limitedly raised, so that the influence of the capacitive coupling effect between the node BE and the node P can be effectively suppressed. Therefore, the output loss of the sensing pixel 611 operating in the bright state can be effectively improved. In addition, the voltage changes of the node V_BE of the node BE and the node voltage V_P of the node P from time t9 to time t13 are similar to above description relating from time t1 to time t5, so it is not repeated here.

Figure 8A:
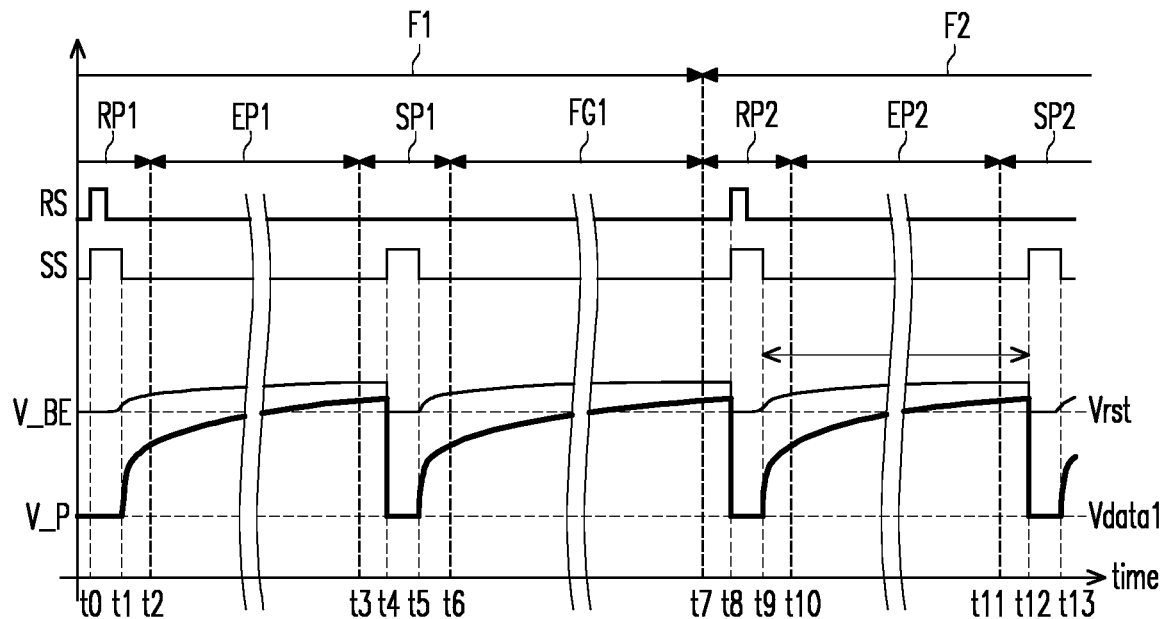
FIG. 8A illustrates a timing diagram of the operation of the sensing pixel of FIG. 6 in the dark state according to another embodiment of the disclosure.

FIG. 8A illustrates a timing diagram of the operation of the sensing pixel of FIG. 6 in the dark state according to another embodiment of the disclosure. Referring to FIG. 1A, FIG. 6, and FIG. 8A, the following embodiment will take the one sensing pixel 611 of FIG. 6 in the dark state as another example. In the embodiment of the disclosure, the timings of the reset signal RS and the scan signal SS are same as the above embodiment of FIG. 2B, so it is not repeated here. Specifically, in the reset period RP1 of the sensing frame F1, due to the transistor M1 and transistor M3 are turned on during the period from time t0 to time t1, the node voltage V_BE of the node BE may be reset to the reset voltage Vrst, and the node voltage V_P of the node P may be charged to the reset voltage Vdara1 (Dark state). Then, during the period between time t1 and time t4 (include the exposure period EP1 between time t2 and time t3), the transistor M1 and transistor M3 are turned off, and the node BE and the node P are in floating state. Since the sensing pixel 611 is in the dark state, the photosensitive element PD does not generate the photo current. In the embodiment of the disclosure, there may have a leakage current from the first terminal to the second terminal of the transistor M2, but the node voltage V_P of the node P may be limitedly raised during the period of time t1 to time t4. Moreover, the node voltage V_BE of the node BE may also be limitedly raised during the period of time t1 to time t4.

During the scan period SP1 of the sensing frame F1, due to the transistor M3 is turned on and the transistors M1 is turned off from time t4 to time t5, the transistor M2 is operated as the source follower, and the node voltage V_P of the node P may be charged to the data voltage Vdata1. That is, the voltage difference (Same as the definition of the above parameter $\Delta V_P$) of the node voltage V_P of the node P between the reset period RP1 and the scan period SP1 can be effectively suppressed by the storage capacitor Cs. Moreover, since the voltage difference (Same as the definition of the above parameter $\Delta V_{BE}$) of the node voltage V_BE of the node BE between the reset period RP1 and the scan period SP1 depends on the voltage difference of the node voltage V_P of the node P between the reset period RP1 and the scan period SP1, the voltage difference of the node voltage V_BE of the node BE between the reset period RP1 and the scan period SP1 can be effectively reduced correspondingly, thus the influence of the output loss may be effectively reduce.

Then, during the period between the time t5 and time t8 (include the frame gap period FG1 between the time t6 and the time t7), the transistor M1 and transistor M3 are turned off, and the node BE and the node P are in floating state again. Although, there may have the leakage current from the first terminal to the second terminal of the transistor M2, so that the node voltage V_P of the node P may be raised during the time t5 to time t8. Due to the influence of the storage capacitor Cs, the node voltage V_P of the node P is also limitedly raised. Moreover, in the reset period RP2 of the sensing frame F2, due to the transistor M1 is turned on during the period of time t8 to time t9, the node voltage V_BE of the node BE may be reset to the reset voltage Vrst again, and a node voltage V_P of the node P may be charged to the data voltage Vdata1 again, so that the influence of the capacitive coupling effect between the node BE and the node P can be effectively suppressed. Therefore, the output loss of the sensing pixel 611 operating in the dark state can be effectively improved. In addition, the voltage changes of the node V_BE of the node BE and the node voltage V_P of the node P from time t9 to time t13 are similar to above description relating from time t1 to time t5, so it is not repeated here.

Figure 8B:
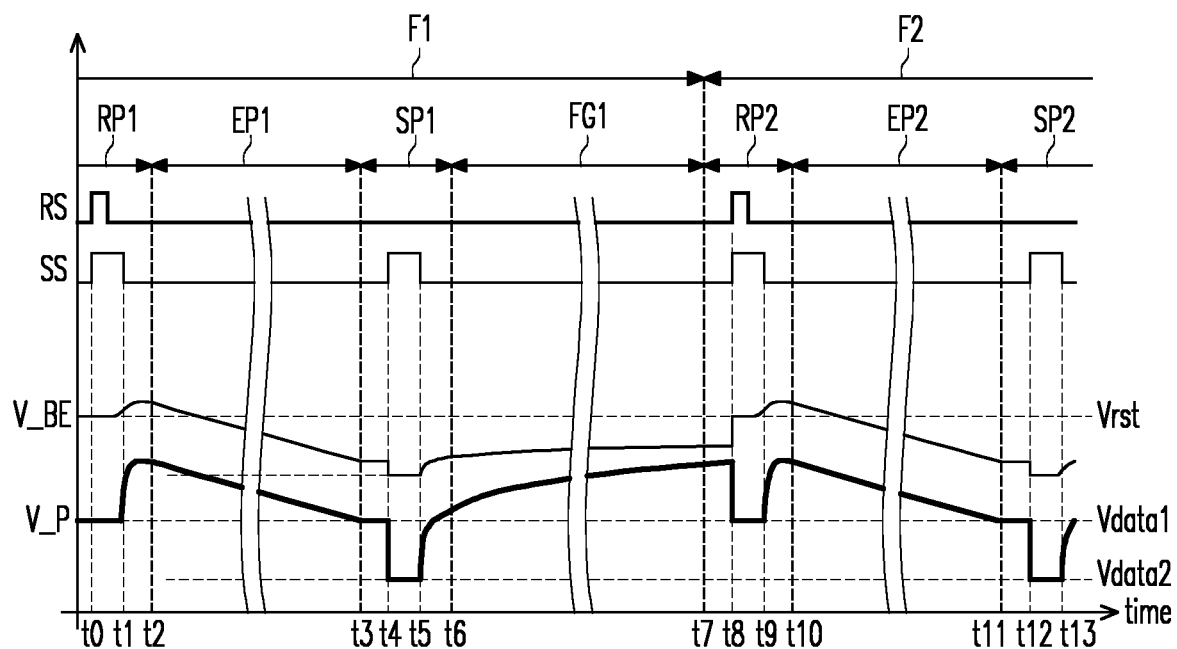
FIG. 8B illustrates a timing diagram of the operation of the sensing pixel of FIG. 6 in the bright state according to another embodiment of the disclosure.

FIG. 8B illustrates a timing diagram of the operation of the sensing pixel of FIG. 6 in the bright state according to another embodiment of the disclosure. Referring to FIG. 1A, FIG. 3, and FIG. 8B, the following embodiment will take the one sensing pixel 611 of FIG. 6 in the bright state as another example. In the embodiment of the disclosure, the timings of the reset signal RS and the scan signal SS are same as the above embodiment of FIG. 2C, so it is not repeated here. Specifically, in the reset period RP1 of the sensing frame F1, due to the transistor M1 and the transistor M3 are turned on during the period from time t0 to time t1, the node voltage V_BE of the node BE may be reset to the reset voltage Vrst, and the node voltage V_P of the node P may be charged to the reset voltage Vdata1 (Dark state). Then, during the period between time t1 and time t4 (include the exposure period EP1 between time t2 and time t3), the transistor M1 and transistor M3 are turned off, and the node BE and the node P are in floating state. Since the sensing pixel 311 is in the bright state, the photosensitive element PD may generate the photo current to the node BE, so that the node voltage V_BE is decreased. Correspondingly, since the node voltage V_P of the node P depends on the node voltage V_BE of the node BE, the node voltage V_P of the node P is also decreased. According to some embodiments, in the embodiment of the disclosure, the voltage difference of the node voltage V_P of the node P during the period of time t1 to time t4 is mainly affected by the capacitive coupling effect from the voltage difference of the node voltage V_BE of the node BE during the period of time t1 to time t4 rather than the leakage current from the first terminal to the second terminal of the transistor M2.

During the scan period SP1 of the sensing frame F1, due to the transistor M3 is turned on and the transistors M1 is turned off from time t4 to time t5, the transistor M2 is operated as the source follower, and the node voltage V_P of the node P be outputted, where the node voltage V_P of the node P may be charged to the data voltage Vdata2 (Bright state). Therefore, the readout circuit 140 may readout the sensing result (data) according to the data voltage Vdata2, where the sensing result corresponds to the voltage change of the node voltage V_P of the node P at time t4. Furthermore, similar as the dark state of the above embodiment of FIG. 8A, the voltage difference of the node voltage V_BE of the node BE between the reset period RP1 and the scan period SP1 causing by the influence of the capacitive coupling effect from the node voltage V_P of the node P can be effectively suppressed correspondingly.

Then, during the period between the time t5 and time t8 (include the frame gap period FG1 between the time t6 and the time t7), the transistor M1 and transistor M3 are turned off, and the node BE and the node P are in floating state again. Although, there may have the leakage current from the first terminal to the second terminal of the transistor M2, so that the node voltage V_P of the node P may be raised during the time t5 to time t8. Due to the influence of the storage capacitor Cs, the node voltage V_P of the node P is also limitedly raised. Moreover, in the reset period RP2 of the sensing frame F2, due to the transistor M1 and the transistor M3 are is turned on during the period of time t8 to time t9, the node voltage V_BE of the node BE may be reset to the reset voltage Vrst again, and the node voltage V_P of the node P may be charged to the data voltage Vdata1, so that the influence of the capacitive coupling effect between the node BE and the node P can be effectively suppressed. Therefore, the output loss of the sensing pixel 611 operating in the bright state can be effectively improved. In addition, the voltage changes of the node V_BE of the node BE and the node voltage V_P of the node P from time t9 to time t13 are similar to above description relating from time t1 to time t5, so it is not repeated here.

Figure 9:
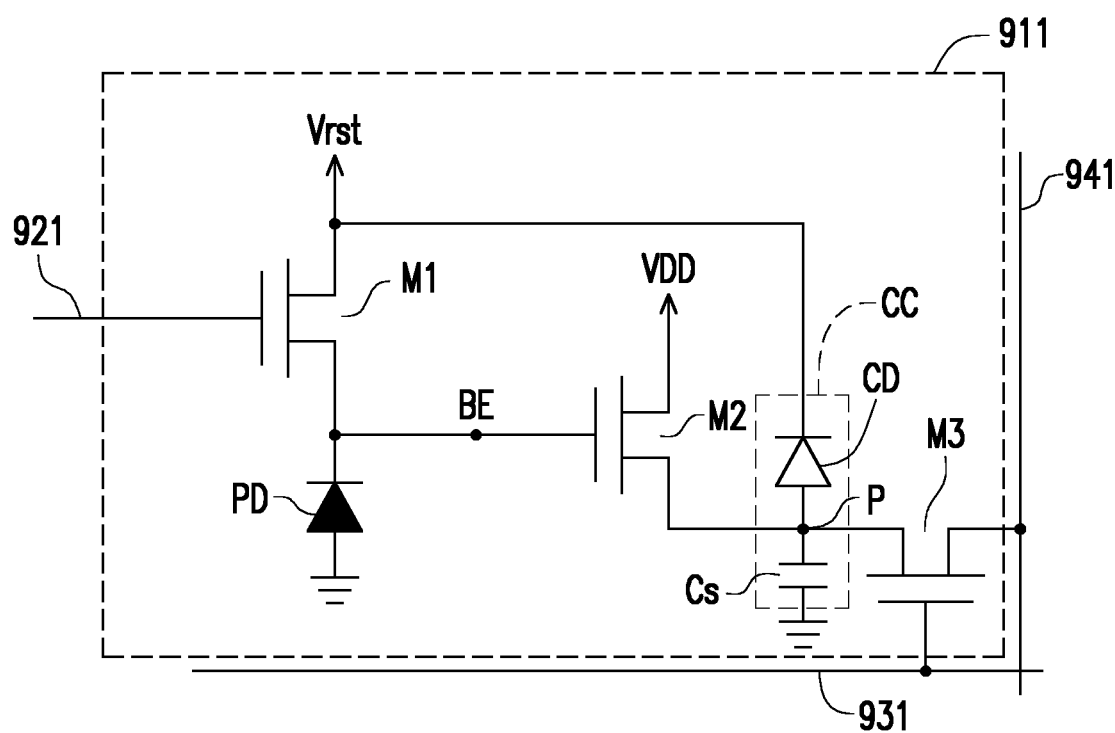
FIG. 9 illustrates a schematic diagram of a sensing pixel according to a fourth embodiment of the disclosure.

FIG. 9 illustrates a schematic diagram of a sensing pixel according to a fourth embodiment of the disclosure. Referring to FIG. 9, the circuit architecture of each of the sensing pixels 111_1 to 111_M of FIG. 1A may be the same as the circuit architecture of the sensing pixel 311 of FIG. 9. The sensing pixel 911 includes at least three transistors M1 to M3, a photosensitive element PD and a clamp circuit CC. The clamp circuit CC can include a clamp diode CD and a storage capacitor Cs. In the embodiment of the disclosure, the sensing pixel 911 may be a 3T architecture of an active pixel sensor, but the disclosure is not limited thereto. In the embodiment of the disclosure, a first terminal of the transistor M1 is coupled to a reset voltage Vrst, and a second terminal of the transistor M1 is coupled to a first terminal of the photosensitive element PD. A control terminal of the transistor M1 is coupled to a reset signal line 921, where the reset signal line 921 may be one of the reset signal lines 121_1 to 121_N of FIG. 1A. A second terminal of the photosensitive element PD is coupled to a ground voltage. A control terminal of the transistor M2 is coupled to the first terminal of the photosensitive element PD, and the first terminal of the transistor M2 is coupled to a power supply voltage (VDD), but the disclosure is not limited thereto. In one embodiment of the disclosure, the first terminal of the transistor M2 may be coupled to power supply voltage. A first terminal of the transistor M3 is coupled to a second terminal of transistor M2, and a control terminal of the transistor M3 is coupled to a scan signal line 931, where the scan signal line 931 may be one of the scan signal lines 131_1 to 131_N of FIG. 1A. A second terminal of the transistor M3 is coupled to an output signal line 941, where the output signal line 141 may be one of the output signal lines 141_1 to 141_P of FIG. 1A. A first terminal of the clamp diode CD is coupled to the reset voltage Vrst. A second terminal of the clamp diode CD is coupled to the second terminal of the transistor M2 and the first terminal of the transistor M3. A first terminal of the storage capacitor Cs is coupled to the second terminal of the transistor M2 and the first terminal of the transistor M3. A second terminal of the storage capacitor Cs is coupled to the ground voltage.

According to some embodiments, the timings of the reset signal and the scan signal of the sensing pixel 911 can apply to the above embodiment of FIG. 2B or 4A, etc. Therefore, enough teachings and recommendations for related implementation methods and technical effects of the sensing pixel 911 of the embodiment may be learned from related descriptions of the embodiments of FIG. 1A to FIG. 8B, and details thereof are not repeated.

In summary, in some embodiments, the electronic device and control method of the disclosure can simultaneously turn on the first transistor (the reset transistor) and the third transistor (the select transistor) during the reset period of the sensing pixel. In some embodiments, a clamp circuit is disposed at the output node (node P) of the sensing pixel. As a result, in some embodiments, the leakage current or the capacitive coupling effect of the transistor can have less influence, and the voltage at the output node can be more stable, thus improving the output loss of the sensing pixel.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A control method for an electronic device, the electronic device comprising a sensing pixel, wherein the sensing pixel comprises a photosensitive element, a first transistor, a second transistor, a third transistor, and a clamp circuit, wherein the first transistor and the second transistor are coupled to the photosensitive element, the third transistor is coupled to the second transistor, and the clamp circuit is coupled to the second transistor, wherein the control method comprises:
   during a reset period, providing a reset signal to the first transistor of the sensing pixel; and
   during the reset period, providing a scan signal to the third transistor of the sensing pixel,
   wherein a reset signal waveform of the reset signal and a first scan signal waveform of the scan signal are at least partially overlapped,
   wherein the clamp circuit comprises at least one of a clamp diode and a storage capacitor, wherein the clamp diode is coupled between a reset voltage and the second transistor.

2. The control method according to the claim 1, wherein a falling edge of the reset signal waveform of the reset signal occurs earlier than a falling edge of the first scan signal waveform of the scan signal.

3. The control method according to the claim 1, wherein a waveform width of the reset signal waveform of the reset signal is smaller than a waveform width of the first scan signal waveform of the scan signal.

4. The control method according to the claim 1, further comprising:
   during a sensing frame, providing the scan signal to the sensing pixel, wherein the scan signal includes a second scan signal waveform not overlapping with the first scan signal waveform.

5. The control method according to the claim 4, further comprising:
   during a scan period, reading out a sensing signal from the third transistor.

6. The control method according to the claim 1, wherein the control method comprises:
   during the reset period, charging a node voltage of a circuit node between the second transistor and the third transistor to a data voltage.

7. An electronic device, comprising:
   a sensing pixel, comprising:
   a photosensitive element;
   a first transistor, coupled to the photosensitive element and for receiving a reset signal;
   a second transistor, coupled to the photosensitive element;
   a third transistor, coupled to the second transistor; and
   a clamp circuit, coupled to the second transistor, and comprising at least one of a clamp diode and a storage capacitor, wherein the clamp diode is coupled between a reset voltage and the second transistor.

8. The electronic device according to the claim 7, wherein the storage capacitor is coupled between the second transistor and a ground voltage.

9. The electronic device according to the claim 7, wherein during a reset period, a reset signal waveform of the reset signal and a first scan signal waveform of a scan signal received by the third transistor are at least partially overlapped.

10. The electronic device according to the claim 7, wherein a falling edge of a reset signal waveform of the reset signal occurs earlier than a falling edge of a first scan signal waveform of a scan signal received by the third transistor.

11. The electronic device according to the claim 10, wherein a waveform width of the reset signal waveform of the reset signal is smaller than a waveform width of the first scan signal waveform of the scan signal.

12. The electronic device according to the claim 7, wherein a scan signal received by the third transistor includes a first scan signal waveform and a second scan signal waveform, and during a sensing frame, the first scan signal waveform and the second scan signal waveform are not overlapped.

13. The electronic device according to the claim 7, further comprising:
   another sensing pixel; and
   a reset circuit, coupled to the sensing pixel and the another sensing pixel, and configured to provide the reset signal to the sensing pixel and another reset signal to the another sensing pixel,
   wherein during a reset period, a reset signal waveform of the reset signal and another reset signal waveform of the another reset signal are not overlapped.

14. The electronic device according to the claim 7, wherein a control terminal of the second transistor is coupled to the photosensitive element, and a first terminal of the second transistor is coupled to a power supply voltage.

15. The electronic device according to the claim 7, wherein the storage capacitor is coupled between the second transistor and a ground voltage.

* * * * *